United States Patent
Buck

(10) Patent No.: US 11,416,938 B2
(45) Date of Patent: *Aug. 16, 2022

(54) ORDER ENTRY ACTIONS

(71) Applicant: TRADING TECHNOLOGIES INTERNATIONAL INC., Chicago, IL (US)

(72) Inventor: Brian J. Buck, Livermore, CA (US)

(73) Assignee: Trading Technologies International, inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/121,345

(22) Filed: Dec. 14, 2020

(65) Prior Publication Data

US 2021/0097613 A1 Apr. 1, 2021

Related U.S. Application Data

(63) Continuation of application No. 16/678,676, filed on Nov. 8, 2019, now Pat. No. 10,902,517, which is a
(Continued)

(51) Int. Cl.
*G06Q 40/04* (2012.01)
*G06F 3/04812* (2022.01)
(Continued)

(52) U.S. Cl.
CPC ......... *G06Q 40/04* (2013.01); *G06F 3/04812* (2013.01); *G06F 3/04883* (2013.01);
(Continued)

(58) Field of Classification Search
None
See application file for complete search history.

(56) References Cited

U.S. PATENT DOCUMENTS 5,598,183 A 1/1997 Robertson et al.
5,839,117 A 11/1998 Cameron et al.
(Continued)

FOREIGN PATENT DOCUMENTS

CA 2803907 C 1/2001
GB 2348520 A 10/2000
(Continued)

OTHER PUBLICATIONS

TradeOMS automates trading out of microsoft excel. (Apr. 17, 2006). Business Wire Retrieved from https://dialog.proquest.com/professional/docview/1072501186?accountid=131444 on Mar. 31, 2022 (Year: 2006).*

(Continued)

*Primary Examiner* — Kito R Robinson
(74) *Attorney, Agent, or Firm* — McDonnell Boehnen Hulbert & Berghoff LLP

(57) ABSTRACT

Various embodiments disclosed herein relate to order entry. In the electronic trading process, order entry involves setting one or more order entry parameters, sending one or more order entry parameters, or both setting and sending one or more order entry parameters. As will be described in more detail below, various order entry actions, such as moving a cursor across an order entry line, moving a cursor into an order entry region, pressing an order entry button, or performing a gesture, may be used to trigger the setting, sending, or both setting and sending of one or more order entry parameters. At least some embodiments relate to
(Continued)

enabling an order entry action before the order entry action is able to set, send, or both set and send one or more order entry parameters.

12 Claims, 12 Drawing Sheets

Related U.S. Application Data continuation of application No. 15/490,196, filed on Apr. 18, 2017, now Pat. No. 10,521,860, which is a continuation of application No. 14/151,366, filed on Jan. 9, 2014, now Pat. No. 9,672,563, which is a continuation of application No. 12/827,881, filed on Jun. 30, 2010, now Pat. No. 8,660,934.

(51) Int. Cl.
G06F 3/04883 (2022.01)
G06Q 40/00 (2012.01)
G06Q 20/10 (2012.01)
G06Q 40/06 (2012.01)
G06Q 30/08 (2012.01)

(52) U.S. Cl.
CPC ............. *G06Q 40/00* (2013.01); *G06Q 20/10* (2013.01); *G06Q 30/08* (2013.01); *G06Q 40/06* (2013.01)

(56) References Cited

U.S. PATENT DOCUMENTS

| | | | |
|---|---|---|---|
| 6,134,535 A | 10/2000 | Belzberg | |
| 6,362,842 B1 | 3/2002 | Tahara et al. | |
| 7,124,110 B1 | 10/2006 | Kemp, II et al. | |
| 7,228,289 B2 | 6/2007 | Brumfield et al. | |
| 7,389,258 B2 | 6/2008 | Brumfield et al. | |
| 7,389,264 B2 | 6/2008 | Kemp, II et al. | |
| 7,447,655 B2 | 11/2008 | Brumfield et al. | |
| 7,454,382 B1 | 11/2008 | Triplett | |
| 7,536,343 B2 | 5/2009 | Brann et al. | |
| 7,546,550 B1 | 6/2009 | Buck | |
| 7,580,883 B2 | 8/2009 | Borts | |
| 7,616,191 B2 | 11/2009 | Matta | |
| 7,620,588 B1 | 11/2009 | Duquette | |
| 7,624,066 B2 | 11/2009 | Janowski et al. | |
| 7,627,517 B2 | 12/2009 | Badenhorst et al. | |
| 7,676,411 B2 | 3/2010 | Kemp, II et al. | |
| 7,734,533 B2 | 6/2010 | Mackey, Jr. et al. | |
| 7,747,749 B1 | 6/2010 | Erikson et al. | |
| 7,805,355 B2 | 9/2010 | Wigzell | |
| 7,813,998 B1 | 10/2010 | Mauro, Jr. et al. | |
| 8,027,908 B2 | 9/2011 | Borts | |
| 8,037,422 B1 | 10/2011 | Buck | |
| 8,086,519 B2 | 12/2011 | Mylet et al. | |
| 8,140,416 B2 | 3/2012 | Borkovec et al. | |
| 8,463,652 B2 | 6/2013 | De Boer et al. | |
| 8,589,280 B2 | 11/2013 | Rosenthal et al. | |
| 8,600,861 B2 * | 12/2013 | Rutt ...................... G06Q 40/04 705/37 |
| 8,660,934 B2 | 2/2014 | Buck | |
| 8,671,044 B2 | 3/2014 | Lutnick et al. | |
| 8,914,305 B2 | 12/2014 | Buck | |
| 9,672,563 B2 | 6/2017 | Buck | |
| 9,830,655 B2 | 11/2017 | Buck | |
| 10,521,860 B2 | 12/2019 | Buck | |
| 2002/0010582 A1 | 1/2002 | Firman | |
| 2002/0054104 A1 | 5/2002 | Berczik et al. | |
| 2002/0194115 A1 | 12/2002 | Nordlicht et al. | |
| 2003/0016252 A1 | 1/2003 | Noy et al. | |
| 2003/0126068 A1 | 7/2003 | Hauk et al. | |
| 2003/0172024 A1 | 9/2003 | Kokis et al. | |
| 2004/0098313 A1 | 5/2004 | Agrawal et al. | |
| 2004/0103054 A1 | 5/2004 | Singer | |
| 2004/0117292 A1 | 6/2004 | Brumfield et al. | |
| 2004/0153392 A1 | 8/2004 | West et al. | |
| 2004/0193530 A1 | 9/2004 | Hausman | |
| 2005/0004852 A1 | 1/2005 | Whitney | |
| 2005/0125328 A1 | 6/2005 | Schluetter | |
| 2005/0137960 A1 | 6/2005 | Brann et al. | |
| 2005/0262003 A1 * | 11/2005 | Brumfield .............. G06Q 40/04 705/37 |
| 2006/0100951 A1 | 5/2006 | Mylet et al. | |
| 2006/0129475 A1 | 6/2006 | Badenhorst et al. | |
| 2006/0155626 A1 | 7/2006 | Wigzell | |
| 2006/0168548 A1 | 7/2006 | Kelley et al. | |
| 2006/0265316 A1 | 11/2006 | Brumfield et al. | |
| 2006/0271467 A1 | 11/2006 | Wasendorf, Sr. | |
| 2007/0038549 A1 | 2/2007 | Janowski et al. | |
| 2007/0067744 A1 | 3/2007 | Lane et al. | |
| 2007/0106939 A1 | 5/2007 | Qassoudi | |
| 2007/0118452 A1 | 5/2007 | Mather et al. | |
| 2007/0120823 A1 | 5/2007 | Otsuka et al. | |
| 2007/0183493 A1 | 8/2007 | Kimpe | |
| 2007/0198432 A1 | 8/2007 | Pitroda et al. | |
| 2007/0220448 A1 | 9/2007 | Trewin | |
| 2007/0265953 A1 | 11/2007 | Cunningham et al. | |
| 2007/0265954 A1 * | 11/2007 | Mather ................. G06F 3/0481 705/37 |
| 2007/0273658 A1 | 11/2007 | Yu-Nokari et al. | |
| 2007/0294162 A1 | 12/2007 | Borkovec | |
| 2009/0292633 A1 | 11/2009 | Crist | |
| 2010/0035545 A1 | 2/2010 | Ibrahim et al. | |
| 2010/0057603 A1 | 3/2010 | Janowski | |
| 2010/0176943 A1 | 7/2010 | Snell | |
| 2011/0093374 A1 | 4/2011 | Messina et al. | |
| 2011/0109577 A1 | 5/2011 | Lee et al. | |
| 2012/0005058 A1 | 1/2012 | Buck | |
| 2012/0005059 A1 | 1/2012 | Buck | |
| 2012/0317503 A1 | 12/2012 | Noh et al. | |
| 2014/0129410 A1 | 5/2014 | Buck | |
| 2015/0066734 A1 | 3/2015 | Buck | |
| 2015/0066735 A1 | 3/2015 | Buck | |
| 2016/0180460 A1 | 6/2016 | Rooney et al. | |
| 2017/0221148 A1 | 8/2017 | Buck | |
| 2020/0074551 A1 | 3/2020 | Buck | |

FOREIGN PATENT DOCUMENTS

| | | |
|---|---|---|
| GB | 2420197 A | 5/2006 |
| JP | S62-152039 A | 7/1987 |
| JP | S64-009517 A | 1/1989 |
| JP | H03-048922 A | 3/1991 |
| JP | H03-265920 A | 11/1991 |
| JP | H04-238524 A | 8/1992 |
| JP | H06-096359 A | 4/1994 |
| JP | H06-324809 A | 11/1994 |
| JP | H07-160428 A | 6/1995 |
| JP | H07-234772 A | 9/1995 |
| JP | H10-222307 A | 8/1998 |
| JP | H11-212727 A | 8/1999 |
| JP | 2000-305685 A | 11/2000 |
| JP | 2001-154767 A | 6/2001 |
| JP | 2002-108525 A | 4/2002 |
| JP | 2003-508860 A | 3/2003 |
| JP | 2004-504652 A | 2/2004 |
| JP | 2004-537769 A | 12/2004 |
| JP | 2005-063409 A | 3/2005 |
| JP | 2005-100265 A | 4/2005 |
| JP | 2005-523506 A | 8/2005 |
| JP | 2005-352738 A | 12/2005 |
| JP | 2006-500676 A | 1/2006 |
| JP | 2007-519091 A | 7/2007 |
| JP | 2007-249970 A | 9/2007 |
| JP | 2008-508617 A | 3/2008 |
| JP | 2008-112475 A | 5/2008 |
| JP | 2008-532189 A | 8/2008 |
| JP | 2009-163410 A | 7/2009 |
| JP | 2009-531786 A | 9/2009 |
| JP | 2011-511332 A | 4/2011 |
| WO | 2001/65403 A2 | 9/2001 |
| WO | 2002/29686 A1 | 4/2002 |
| WO | 2003/090032 A2 | 10/2003 |

(56) References Cited

FOREIGN PATENT DOCUMENTS

| | | | |
|---|---|---|---|
| WO | 2004/029789 A2 | 4/2004 |
| WO | 2005/057353 A2 | 6/2005 |
| WO | 2007/123773 A1 | 1/2007 |
| WO | 2007/106753 A2 | 9/2007 |

OTHER PUBLICATIONS

News, B. (Jan. 25, 2007). NYSE completes shift to hybrid trading; automated system speeds transactions: [central edition]. Buffalo News Retrieved from https://dialog.proquest.com/professional/docview/381819400?accountid=131444 on Mar. 31, 2022 (Year: 2007).*
Accot, J. and Zhai, S., "Beyond Fitts' Law: Models for Trajectory-based HCI tasks," Proceedings of the CHI' *1997 Conference on Human Factors in Computing Systems*, Mar. 22-27, 1997, New York: ACM, pp. 295-302.
Asano, T., et al., "Predictive Interaction Using the Delphian Desktop," *Proceedings of the User Interface Software and Technology 2005 Conference*, Oct. 23-26, 2005, Seattle, Washington, USA, ACM, 2005, 9 pages.
Balakrishnan, R., "'Beating' Fitts' Law: Virtual Enhancements for Pointing Facilitation," *International Journal of Human-Computer Studies*, 2004, vol. 61, pp. 857-874.
Blanch, R. and Ortega, M., "Rake Cursor: Improving Pointing Performance with Concurrent Input Channels," *Proceedings of the CHI' 2009—27$^{th}$ International Conference on Human Factors in Computing Systems*, Boston, MA, Apr. 4-9, 2009, New York, NY: ACM, 2009, pp. 1415-1418.
Blanch, R., et al., "Semantic Pointing: Improving Target Acquisition with Control-Display Ratio Adaption," *Proceedings of the CHI' 2004 Conference on Human Factors in Computing Systems*, Vienna, Austria, Apr. 24-29, 2004, New York, NY: ACM, 2004, pp. 519-526.
Chan, A., "Motion Prediction for Caching and Prefetching in Mouse-Drive DVE Navigation," *ACM Transactions on Internet Technology*, Feb. 2005, vol. 5, No. 1, pp. 70-91.
Chan, A., et al., "A Motion Prediction Method for Mouse-Based Navigation," *Proceedings of the 2001 Computer Graphics International Conference, Hong Kong, China*, Jul. 3-6, 2001, IEEE Computer Society, 2001, 8 pages.
"Electronic order entry offers speed, accuracy and ease of use," Futures Magazine, Iss. 26, p. 69, 1997, retrieved from: https://dialog.proquest.com/professional/docview/1054376529?accountid=131444 on Sep. 17, 2020.
Designer Appliances, Inc. 'Nib and McNib Clickless Software Overview' Apr. 27, 2005. Retrieved from the internet on Feb. 14, 2014 from: https://web.archive.org/web/20050427222702/http://www.aerobicmouse.com/software-overview/nib/.
Dontclick.It, Institute for Interactive Research. [Retrieved from internet on Mar. 14, 2017]< URL: https://web.archive.org/web/20051013062359/http://www.dontclick.it > Published on Oct. 13, 2005 as per Wayback Machine.
Extended European Search Report in European Patent Application No. 11810108.8 dated Mar. 15, 2016, dated Mar. 24, 2016.
Grossman, T. and Balakrishnan, R., "The Bubble Cursor: Enhancing Target Acquisition by Dynamic Resizing of the Cursor's Activation Area," *Proceedings of the CHI' 2005 Conference on Human Factors in Computing Systems*, Portland, OR, Apr. 2-7, 2005, New York, NY: ACM, 2005, pp. 281-290.
Guiard, Y., et al., "Object Pointing: A Complement to Bitmap Pointing in GUIs," Proceedings of the 2004 Graphics Interface Conference, May 17-19, 2004, London, Ontario, Canadian Human-Computer Communications Society, 2004, pp. 9-16.
Gutwin, C., et al., "Using Cursor Prediction to Smooth Telepointer Jitter," *Proceedings of the 2003 International ACM SIGGROUP Conference on Supporting Group Work*, Nov. 9-12, 2003, Sanibel Island, FL: ACM, 2003, pp. 294-301.

Heaton, T.H. (1301). Graphical order entry user interface for trading system Retrieved from http://dialog.proquest.com/professional/docview/1315713703?accountid=142257 on Jan. 5, 2016.
Herzog, J. E. (1985). A dealer's experience of automated trading Retrieved from http://dialog.proquest.com/professional/docview/828343561?accountid=142257 on Aug. 9, 2019 (Year: 1985).
International Search Report and Written Opinion of International Application No. PCT/US2011/042373, dated Sep. 23, 2011 (dated Oct. 6, 2011).
International Search Report and Written Opinion of International Application No. PCT/US2011/042268, dated Sep. 28, 2011 (dated Oct. 20, 2011).
Jiang, B., "Improving Awareness with Remote Control Point Movement Prediction in Real-Time Collaborative Graphics Editing Systems," *International Journal of Computer Science and Network Security (IJCSNS)*, Mar. 2006, vol. 6, No. 3A, pp. 203-207.
Jiang, B., et al., "SDSPM-based User Interest Prediction in Collaborative Graphics Design Systems under Ubiquitous Environment," *Proceedings of the 13$^{th}$ International Conference on Computer Supported Cooperative Work in Design*, CSCWD 2009, Apr. 22-24, 2009, Santiago, Chile, IEEE, 2009, pp. 414-419.
Kabbash, P. and Buxton, W., "The 'Prince' Technique: Fitts' Law and Selection Using Area Cursors," *Proceedings of the CHI' 1995 Conference on Human Factors in Computing Systems*, Denver, CO, May 7-11, 1995, New York, NY: ACM, 1995, pp. 273-279.
Komogortsev, O.V., "Eye Movement Prediction by Oculomotor Plant Modeling with Kalman Filter 2003-2007," Doctoral Dissertation, Kent State University: Kent, OH, 2007, 120 pages.
Kulkosky, V. (1988). Mouse shows boldness of market automation system. Wall Street Computer Review, 5(8), 12, Retrieved Sep. 13, 2013.
Making a Case for Speed. (1994), Informationweek, 58. Retrieved from http://dialog.proquest.com/professional/docview/682070524?accountid=142257 on Jan. 5, 2016.
MacKenzie, I.S. and Buxton, W., "The Prediction of Pointing and Dragging Times in Graphical User Interfaces," *Interacting with Computers*, 1994, vol. 6, pp. 213-227.
MacKenzie, I.S., "Movement Time Prediction in Human-Computer Interfaces," In R.M. Baecker, et al. (Eds.), *Readings in Human-Computer Interaction* (2$^{nd}$ Ed.), Kaufmann: Los Altos, CA, 1992, pp. 1-19.
Oel, et al., "Time Prediction of Mouse-based Cursor Movements," *Proceedings of Joint AFIHM-BCS Conference on Human-Computer Interaction IHM-HCI'2001*. Lille, France: Sep. 10-14, 2001, vol. II, pp. 37-40.
Roussel, N. and Chapuis, O., "UIMarks: Quick Graphical Interaction with Specific Targets," *LRI Technical Repport No. 1520*, Jun. 2009, Laboratoire de Recherche en Informatique, Orsay, France, 4 pages.
Sears, A. and Shneiderman, B., "Split Menus: Effectively Using Selection Frequency to Organize Menus," *ACM Transactions on Computer-Human Interaction*, Mar. 1994, vol. 1, No. 1, pp. 27-51.
Software system automates trade order entry. (1985). Bank Systems & Equipment, 22(5), Retrieved from http://dialog.proquest.com/professional/docview/827993147?accountid=142257 on Aug. 9, 2019 (Year: 1985).
Van Mensvoort, K., and Keunning, H. "Cursor Trajectory Prediction Using a Genetic Algorithm (Beta Version)" [online], www.koert.com, n.d. [Retrieved on Mar. 10, 2010] from the Internet: http://www.koert.com/work/cursorpredictor/.
Wexler, M. and Klam, F., "Movement Prediction and Movement Production," *Journal of Experimental Psychology: Human Perception and Performance*, 2001, vol. 27, No. 1, pp. 48-64.
Wobbrock, J.O., et al., "The Angle Mouse: Target-Agnostic Dynamic Gain Adjustment Based on Angular Deviation," *Proceedings of the CHI' 2009—27$^{th}$ International Conference on Human Factors in Computing Systems*, Boston, MA, Apr. 4-9, 2009, New York, NY: ACM, 2009, pp. 1401-1410.
Zhai, S., "Manual and Gaze Input Cascaded (MAGIC) Pointing," *Proceedings of the CHI' 1999 Conference on Human Factors in Computing Systems: The CHI is the Limit*, Pittsburg, PA, May 15-20, 1999, New York, NY: ACM, 1999, pp. 246-253.

(56) References Cited

OTHER PUBLICATIONS

U.S. Appl. No. 12/827,861, Non-Final Office Action dated Mar. 2, 2012.
U.S. Appl. No. 12/827,861, Response to Non-Final Office Action filed Jun. 1, 2012.
U.S. Appl. No. 12/827,861, Restriction Requirement dated Oct. 18, 2012.
U.S. Appl. No. 12/827,861, Response to Restriction Requirement filed Oct. 24, 2012.
U.S. Appl. No. 12/827,861, Final Office Action dated Feb. 13, 2013.
U.S. Appl. No. 12/827,861, Response to Final Office Action filed May 13, 2013.
U.S. Appl. No. 12/827,861, Non-Final Office Action dated May 20, 2013.
U.S. Appl. No. 12/827,861, Response to Non-Final Office Action filed Aug. 19, 2013.
U.S. Appl. No. 12/827,861, Final Office Action dated Dec. 4, 2013.
U.S. Appl. No. 12/827,861, Advisory Action dated Feb. 20, 2014.
U.S. Appl. No. 12/827,861, Non-Final Office Action dated Mar. 28, 2014.
U.S. Appl. No. 12/827,861, Notice of Allowance dated Aug. 7, 2014.
U.S. Appl. No. 12/827,881, Non-Final Office Action dated Feb. 9, 2012.
U.S. Appl. No. 12/827,881, Response to Non-Final Office Action filed May 9, 2012.
U.S. Appl. No. 12/827,881, Final Office Action dated Jun. 14, 2012.
U.S. Appl. No. 12/827,881, Response to Final Office Action filed Aug. 14, 2012.
U.S. Appl. No. 12/827,881, Advisory Action dated Aug. 27, 2012.
U.S. Appl. No. 12/827,881, RCE and Response filed Sep. 10, 2012.
U.S. Appl. No. 12/827,881, Notice of Allowance dated Oct. 9, 2013.
U.S. Appl. No. 14/536,180, Non-final Office Action dated Dec. 11, 2014.
U.S. Appl. No. 14/536,180, Final Office Action dated Aug. 3, 2015.
U.S. Appl. No. 14/536,180, Non-final Office Action dated Feb. 29, 2016.
U.S. Appl. No. 14/536,223, Non-final Office Action dated Dec. 12, 2014.
U.S. Appl. No. 14/536,223, Final Office Action dated Jul. 31, 2015.
U.S. Appl. No. 14/536,223, Non-final Office Action dated Feb. 26, 2016.
U.S. Appl. No. 14/151,366, Non-Final Office Action dated Mar. 12, 2014.
U.S. Appl. No. 14/151,366, Non-Final Office Action dated Aug. 20, 2014.
U.S. Appl. No. 14/151,366, Final Office Action dated Mar. 18, 2015.
U.S. Appl. No. 14/151,366, Non-Final Office Action dated Sep. 24, 2015.
U.S. Appl. No. 14/151,366, Final Office Action dated Apr. 27, 2016.

\* cited by examiner

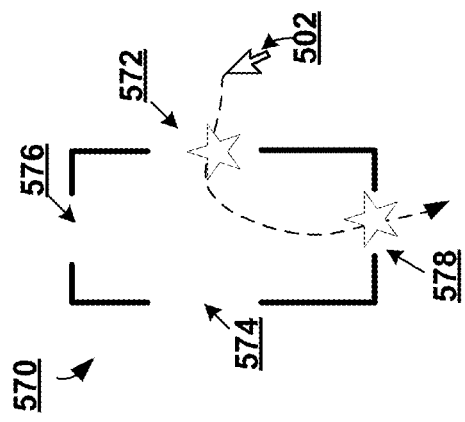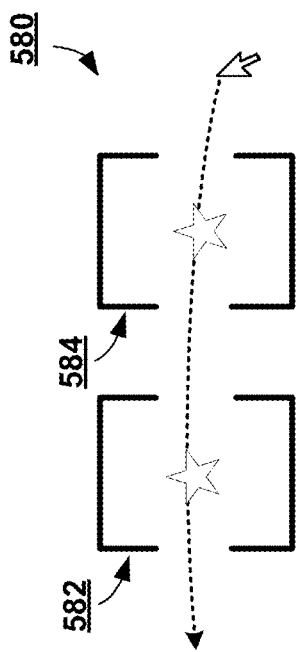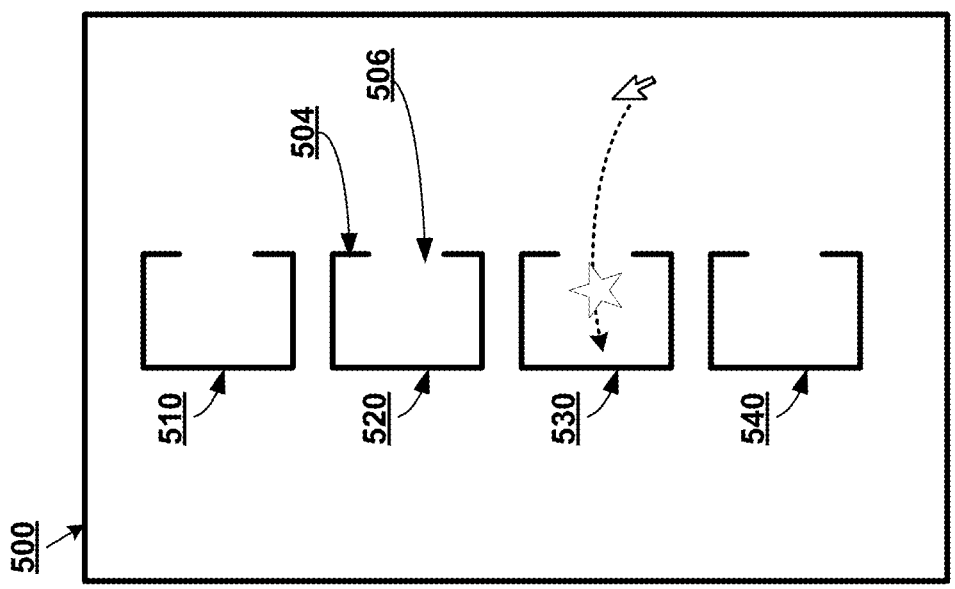
FIG. 5B
FIG. 5C
FIG. 5A

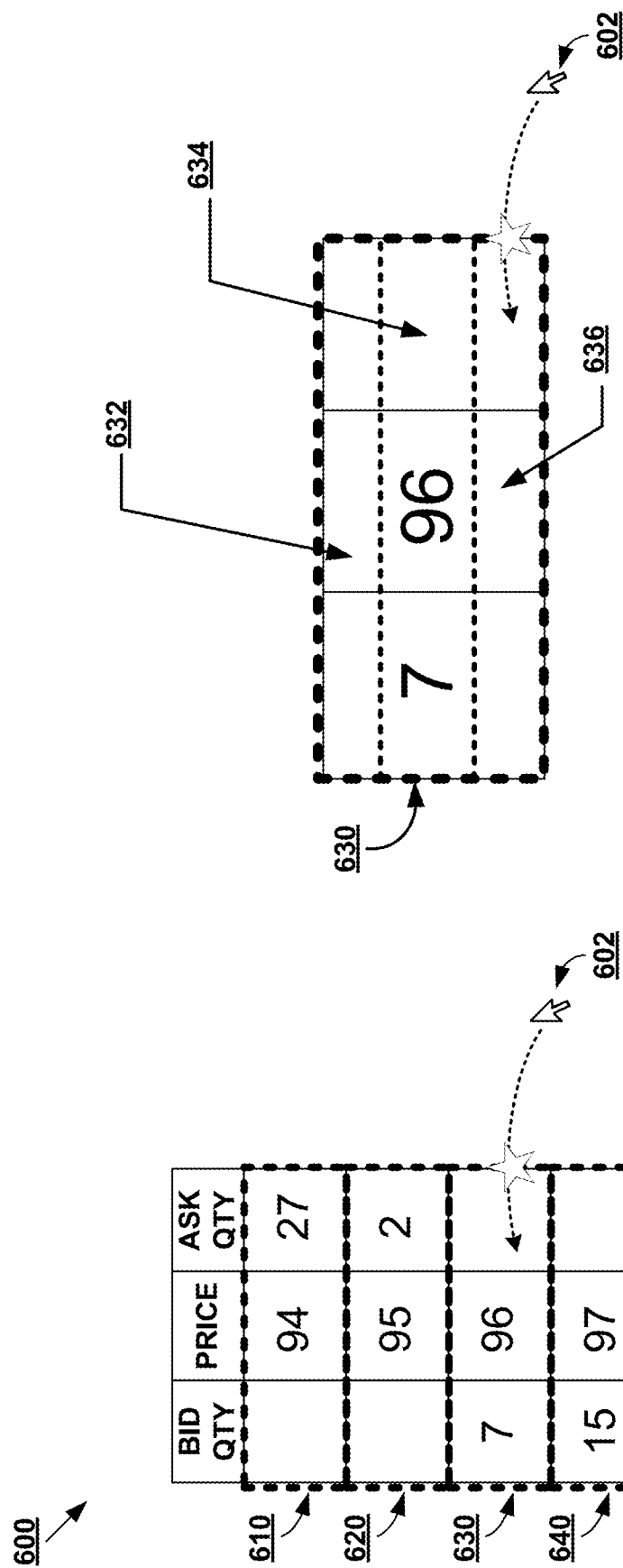

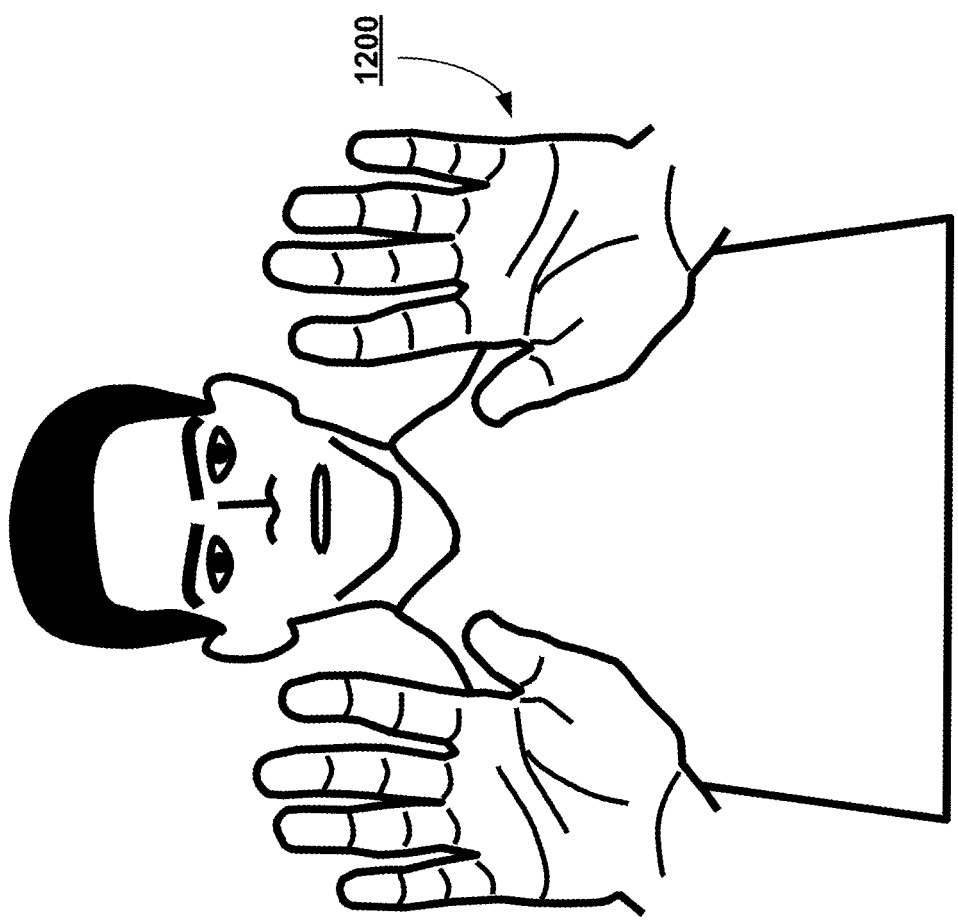

ORDER ENTRY ACTIONS

CROSS REFERENCE TO RELATED APPLICATIONS

This application is a continuation of U.S. patent application Ser. No. 16/678,676, filed Nov. 8, 2019, which is a continuation of U.S. patent application Ser. No. 15/490,196, filed Apr. 18, 2017, now U.S. Pat. No. 10,521,860, which is a continuation of U.S. patent application Ser. No. 14/151,366, filed Jan. 9, 2014, now U.S. Pat. No. 9,672,563, which is a continuation of U.S. patent application Ser. No. 12/827,881, filed Jun. 30, 2010, now U.S. Pat. No. 8,660,934, the contents of each of which are fully incorporated herein by reference for all purposes.

TECHNICAL FIELD

The present patent document relates to electronic trading. In particular, the present patent document relates to trading or exchanging tradeable objects, such as securities or commodities, within an electronic trading system.

BACKGROUND

Electronic trading involves electronically matching orders to buy and sell a tradeable object. These orders may be referred to as trade orders. During the electronic trading process, an electronic exchange generally performs the order matching, such that quantity of one or more trade orders is matched with quantity of one or more contra-side trade orders. For instance, a sell order is contra-side to a buy order with the same price. Similarly, a buy order is contra-side to a sell order with the same price. Unmatched quantity of trade orders is held in the exchange order book until quantity of a trade order is matched or removed from the order book. In addition to matching trade orders, the electronic exchange is typically adapted to provide market data and trade confirmation data to subscribing trading devices.

Once the data is received by a subscribing trading device, a trading platform or trading tool in the trading device may be adapted to output the data to a display screen and allow a user (e.g., a trader) to interact with the displayed data. A trading platform may allow a user to view and process the data and place one or more trade orders. During the process of placing a trade order with the electronic exchange, a user generally provides one or more order entry parameters to the electronic exchange. The electronic exchange receives the order entry parameters and places a trade order into the exchange order book. Sometimes, an algorithmic trading platform in the trading device is used to decide on aspects of the trade order, such as the timing, price, or quantity of the order, or is used to initiate the order without (or with very little) human intervention. Unlike the example directly above, data from the electronic exchange may not always get displayed to the user when an algorithmic trading platform is employed.

It is desirable to improve one, some, or all of the components in the electronic trading system.

SUMMARY

The embodiments described herein include, but are not limited to, various devices, systems, methods, and computer program products. Only a few, of the many, embodiments are summarized in this section.

In an embodiment, a method for order entry includes detecting when an order entry action is performed, where the order entry action does not involve clicking an order entry button, analyzing the order entry action to identify an order entry parameter associated with the order entry action, and in response to detecting the order entry action, setting and sending the order entry parameter, wherein the order entry parameter is sent to an exchange system.

[In an embodiment, logic encoded in one or more tangible media for execution by a processor is provided. When executed, the logic is operable to detect when an order entry action is performed, wherein the order entry action does not involve clicking an order entry button, analyze the order entry action to identify an order entry parameter associated with the order entry action, and in response to detecting the order entry action, set and send the order entry parameter. The order entry parameter is sent to an exchange system.]

BRIEF DESCRIPTION OF THE DRAWINGS

The drawings illustrate example embodiments. As such, the various embodiments should not be limited to the arrangements and instrumentality shown in the drawings. The following provides a brief description of the drawings.

FIGS. 3-12 show exemplary trade order actions.

DETAILED DESCRIPTION

Figure 1:
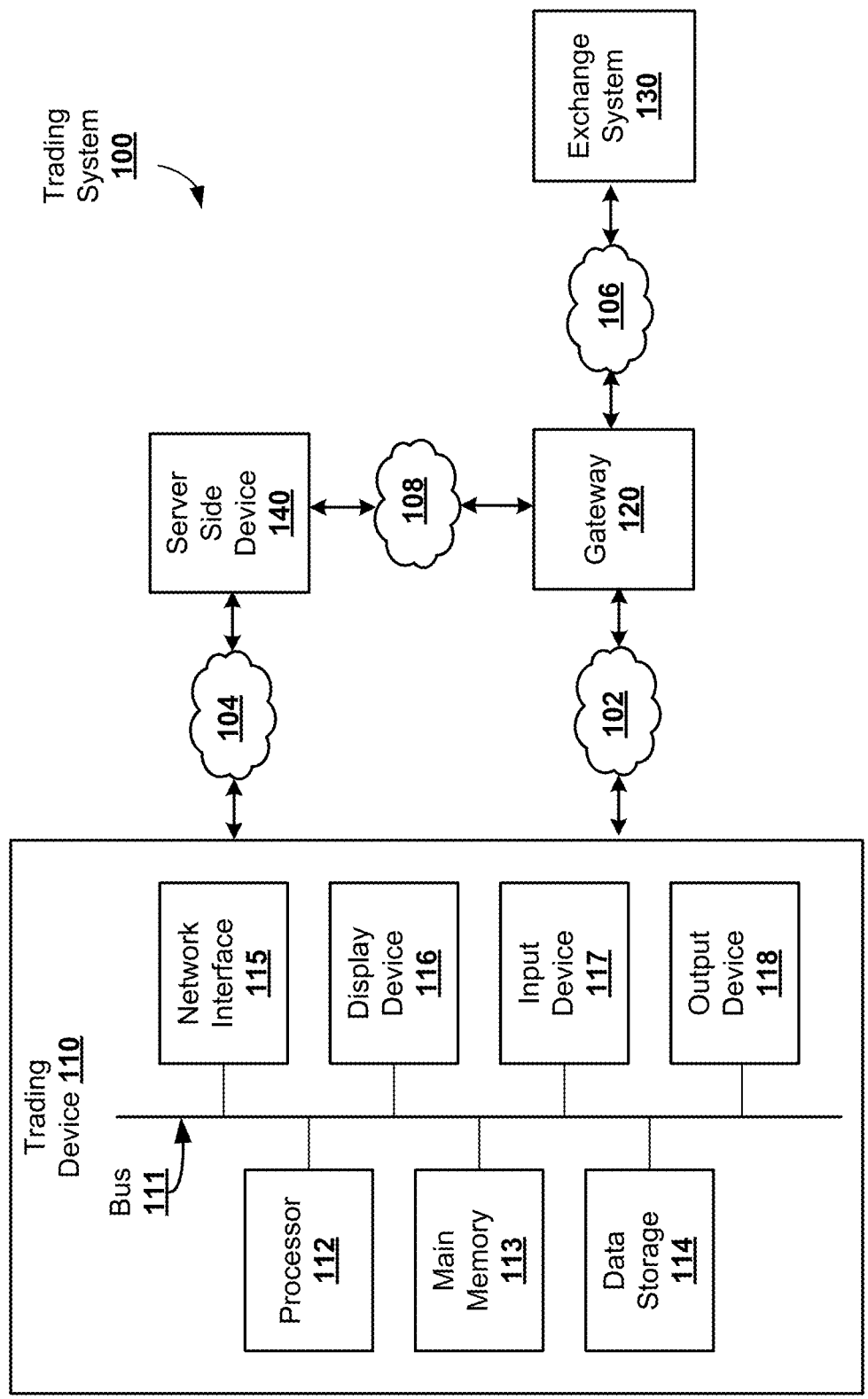
FIG. 1 illustrates an example electronic trading system that may be used during the electronic trading process.

Various embodiments disclosed herein relate to order entry. In the electronic trading process, order entry involves setting one or more order entry parameters, sending one or more order entry parameters, or both setting and sending one or more order entry parameters. As will be described in more detail below, various order entry actions, such as moving a cursor across an order entry line, moving a cursor into an order entry region, selecting an order entry button, or performing a gesture, may be used to trigger the setting, sending, or both setting and sending one or more order entry parameters. At least some embodiments described herein relate to the process of enabling an order entry action. In some embodiments, an order entry action must be enabled before it is able to set, send, or both set and send one or more order entry parameters.

Before explaining any further, it is worth noting again that the various embodiments disclosed herein are not limited in their application to the details of design and arrangement of the components set forth in the previous and following description or as illustrated in the drawings. Instead, the previous description, following description, and the drawings focus on presenting concepts of various embodiments that may stand alone or be combined with each other.

I. Example Trading System

FIG. 1 is a block diagram illustrating an electronic trading system ("trading system") 100. The trading system 100 includes a trading device 110, a gateway 120, and an electronic exchange system ("exchange system") 130. The trading system 100 may include additional, different, or fewer components. For example, as shown in FIG. 1 and discussed in more detail below, the trading system 100 may include a server side device 140. In another example, the trading system 100 may include multiple (for example, two or more) trading devices 110, multiple gateways 120, multiple exchange systems 130, multiple server side devices 140, or any combination thereof.

The trading device 110 is in communication with the gateway 120 via communication network 102. The trading device 110 is in communication with the server side device 140 via communication network 104. The gateway 120 is in communication with the exchange system 130 via communication network 106 and the server side device 140 via communication network 108. The phrase "in communication with" may include in direct communication and indirect communication through one or more intermediary components.

Communication networks 102, 104, 106, 108 can include hardware (for example, servers, routers, gateways, and switches), software (for example, a trading application or a communication application), transmission channels (e.g., T1 lines, T3 lines, Integrated Services Digital Network (ISDN) lines), telecommunication networks (e.g., data network, computer network, the Internet network, wide area network, local area network), or any combination thereof. Communication networks 102, 104, 106, 108 may include wired, wireless, or both wired and wireless networks and may be the same or different types of networks.

The trading device 110 is a personal computer, a workstation, a desktop, a laptop, a mobile device, a handheld device, a server, a gateway, or other computing device(s). For example, the trading device 110 may be a personal computer running a copy of X_TRADER®, which is an electronic trading platform provided by Trading Technologies International, Inc. of Chicago, Ill. As another example, the trading device 110 is a server running an automated trading tool, such as Autotrader® or Autospreader®, which are also provided by Trading Technologies International, Inc. In yet another example, the trading device 110 is a collection of devices, such as a personal computer and a server, working in combination with each other.

The trading device 110 is generally owned, operated, controlled, programmed by, configured by, or otherwise used by a user. As used herein, the phrase "user" may include, but is not limited to, a human (e.g., a trader) or an electronic trading device (e.g., including a processor and memory or an algorithmic trading system). One or more users may be involved in the ownership, operation, control, programming, configuration or other use.

The trading device 110 may be used to electronically trade one or more tradeable objects. As used herein, the phrase "tradeable object" includes products that can be traded with a quantity and a price. Exemplary tradeable objects include financial products such as stocks, options, bonds, futures, currency, warrants, funds derivatives, commodities, traded events, goods, or any combination thereof. Tradeable objects may be "real" or "synthetic." Real tradeable objects are products that are listed by an exchange. Whereas, synthetic tradeable objects are products that are defined by a user and are not listed by an exchange. For example, a synthetic tradeable object may include a combination of real (or other synthetic) products such as a synthetic spread created by a trader utilizing the trading device 110.

Electronically trading one or more tradeable objects may include setting one or more order entry parameters, sending one or more order entry parameters, or both setting and sending one or more order entry parameters. In general, a parameter is a variable that is given a specific value during the execution of a program or of a procedure within a program. A parameter is data that defines a value, such as a price or quantity value. More specifically, an order entry parameter may be part of, associated with, or used to define a trade order. By way of example, a order entry parameter may be, for example, a parameter defining a tradeable object to be bought or sold (hereinafter, a "tradeable object parameter"), a parameter defining a price for the tradeable object(s) (hereinafter, a "price parameter"), a parameter defining a quantity of a tradeable object to be traded (hereinafter, a "quantity parameter"), a parameter defining an order type (hereinafter, a "order type parameter"), or any combination thereof. However, other parameters can be order entry parameters.

A tradeable object parameter, for example, defines one or more tradeable objects to be bought or sold. In some embodiments, the tradeable object parameter defines, for example, a trading strategy. A trading strategy, for example, defines a relationship between one or more tradeable objects to be traded. An exemplary trading strategy is a spread between two or more different tradeable objects, such as a butterfly spread or a calendar spread. Tradeable objects in a spread are typically different than each other. The tradeable objects generally have different underlying products (e.g., corn or soybeans), different expiration dates (e.g., July and September), both different underlying products and expiration dates, or other differences. For example, a first leg may be associated with a contract for July 2010 corn (ZCN0) and a second leg display may be associated with a contract for September 2010 corn (ZCU0). In this example, these tradeable objects are different tradeable objects, even though the underlying product (e.g., corn) is the same in each contract.

A price parameter, for example, defines a price or value (e.g., a derivative of price) for the tradeable object(s) or trading strategy to be traded. A quantity parameter, for example, defines a quantity of a tradeable object to be traded. The quantity parameter may define the number of units, lots, or contracts to be traded.

An order type parameter, for example, defines whether the tradeable object(s) or trading strategy is to be bought or sold. The order type parameter may also define whether the order is a limit order, market order, or other type of order.

The trading device 110 may be adapted to set, send, or both set and send additional, different, or fewer order entry parameters that are directly or indirectly related to an order that has been or will be placed with the exchange system 130. For example, the trading device 110 may send a first order type parameter defining "buy" and a second order type parameter defining "market order." The first and second order type parameters may be combined into a single message or multiple, different messages.

Setting an order entry parameter may include selecting, assigning, or otherwise defining a value, such as a number, letter, word, price, quantity, bit, or byte. As discussed in more detail below, in various embodiments, setting one or more order entry parameters may be triggered by one or more order entry actions. However, in certain embodiments, one or more of the order entry parameters are set as default parameters. For example, a tradeable object parameter may be set based on a default parameter. A default parameter is a parameter that is automatically selected by a computer program in the absence of a choice made by the user. The trading device 110 may automatically select a tradeable object, for example, based on a trading algorithm or market condition. However, in other situations, the tradeable object may be selected by a user, for example, based on which trading tool was selected.

Sending one or more order entry parameters may include, for example, sending the one or more order entry parameters to the exchange system 130 via the gateway 120 or the server side device 140. Order entry parameters, which are related to each other, may be sent at the same or different times, for example, in the same message or different messages. For instance, a tradeable object parameter may be sent ahead of, or along with, a price parameter and quantity parameter that are sent to the trading strategy device or the server side device for the first time. The tradeable object parameter may be stored, for example, at the server side device. With the tradeable object parameter already at the server side device, subsequent incoming price and quantity parameters may be combined or used with the tradeable object parameter and sent collectively to the exchange system. If a change in the tradeable object parameter occurs, then an updated tradeable object parameter may be sent ahead of, or along with, price and quantity parameters following the change. In other embodiments, a price parameter, but not necessarily quantity parameter is sent to the gateway or server side device. For instance, a price parameter may be sent ahead of, along with, or after a quantity parameter.

An order entry parameter may be sent at the request from a user or automatically. For example, a trader may utilize the trading device 110 to place an order for a particular tradeable object. The trader may manually provide various parameters for the trade order such as an order price, quantity, or both price and quantity. As another example, a trading device 110 may automatically calculate one or more parameters for an order and automatically send the order. In some instances, a trading device 110 may prepare the order to be sent but not actually send it without confirmation from the trader.

As shown in FIG. 1, the trading device 110 includes a bus 111, a processor 112, a main memory 113, a data storage 114, a network interface 115, a display device 116, an input device 117, and an output device 118. The trading device 110 may include additional, different, or fewer components. For example, multiple buses, multiple processors, multiple main memory devices, multiple storages, multiple network interfaces, multiple display devices, multiple input devices, multiple output devices, or any combination thereof may be provided. In another example, the trading device 110 may not include an input device 117. Instead, for example, the trading device 110 may be controlled by an external or remote input device via the network interface 115.

The bus 111 is a communication bus, channel, network, circuit, or other mechanism for communicating data between components in the trading device 110. The bus 111 may be communicatively coupled with and transfer data between any of the components of the trading device 110. For example, during an installation process of a trading application, one or more computer-readable instructions that are to be executed by the processor 112 may be transferred from the data storage 114 or the network interface 115 to the main memory 113. When the trading device 110 is running or preparing to run the trading application stored in the main memory 113, the processor 112 may retrieve the instructions from the main memory 113 via the bus 111.

The processor 112 may be a general processor, digital signal processor, application specific integrated circuit, field programmable gate array, analog circuit, digital circuit, programmed processor, combinations thereof, or other now known or later developed processing device. The processor 112 may be a single device or a combination of devices, such as associated with a network or distributed processing. Any processing strategy may be used, such as multi-processing, multi-tasking, parallel processing, remote processing, or the like. Processing may be local or remote and may be moved from one processor to another processor.

The processor 112 may be operable to execute logic encoded in one or more tangible media, such as main memory 113 or data storage 114. As used herein, logic encoded in one or more tangible media includes instructions that are executable by the processor 112 or a different processor. The logic may be stored as part of software, hardware, integrated circuits, firmware, micro-code or the like. The logic may be received from an external communication device via a communication network, for example, connected to the Internet. The processor 112 may execute the logic to perform the functions, acts or tasks illustrated in the figures or described herein.

The main memory 113 and data storage 114 may be tangible media, such as computer readable storage media. Computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media, any combination thereof, or any other now known or later developed tangible data storage device. The main memory 113 and data storage 114 may be a single device or, as shown in FIG. 1, different devices. The main memory 113 and data storage 114 may be adjacent to, part of, programmed with, networked with, or remote from processor 112, such that data stored in the main memory 113 and data storage 114 may be retrieved and processed by the processor 112, for example.

The main memory 113 and data storage 114 may be the same or different types of memory. For example, in one embodiment, the main memory 113 includes both random access memory (RAM) and read only memory (ROM). In this example, the RAM is a dynamic storage device that stores information and instructions to be executed by processor 112. The RAM also may be used for storing temporary variable or other intermediate information during execution of instructions to be executed by processor 112. The ROM is a static storage device for storing static information and instructions for processor 112. Furthermore, in this example, the data storage 114 may be a magnetic disk, optical disk, or flash memory for storing information to be processed by the processor 112 and instructions to be executed by the processor 112.

The main memory 113 and data storage 114 may store instructions that are executable by the processor 112. The instructions may be executed to perform one or more of the acts or functions described herein or shown in the figures. For example, the instructions are executed to perform one, some, or all of the acts shown in FIG. 2.

The network interface 115 may be a one-way or two-way communication coupling. Accordingly, the network interface 115 may communicatively connect one, two, or more communication networks or devices. For example, the bus 111 may be coupled with the communication network 102 and the communication network 104 via the network interface 115, such that one, some, or all of the components of the trading device 110 are accessible or can communicate via the communication network 102 and the communication network 104. Additionally, or alternatively, the network interface 115 may couple the bus 111 with other communication networks. The network interface 115 may be, for example, an integrated services digital network (ISDN) card or a modem to provide a data communication connection. As another example, network interface 115 may be a local area network (LAN) card to provide a data communication connection to a compatible LAN, for example, connected to the Internet. Wireless links may also be implemented. The network interface 115 may send and receive electrical, electromagnetic, or optical signals that carry analog or digital data streams representing various type of information.

The display device 116 may a visual output device, cathode ray tube (CRT) display, electronic display, electronic paper, flat panel display, light-emitting diode (LED) displays, electroluminescent display (ELD), plasma display panels (PDP), liquid crystal display (LCD), thin-film transistor displays (TFT), organic light-emitting diode displays (OLED), surface-conduction electron-emitter display (SED), laser television, carbon nanotubes, nanocrystal displays, head-mounted display, projector, three-dimensional display, transparent display device, or other now known or later developed display.

The display device 116 is adapted to display a trading screen. Trading screens are electronic trading interfaces that enable traders to perform electronic trading acts, such as setting order entry parameters or sending the order entry parameters. Trading screens may also be used for viewing market data. Trading screens may also be used to automate these and additional actions. Trading screens may be provided by a trading application. For example, during operation, X_TRADER™ may provide an electronic trading interface, referred to as MD Trader™ in which working orders and bid and ask quantities are displayed in association with a list of price levels.

Trading screens may display one or more trading tools. Trading tools are electronic tools that allow, assist with, or facilitate electronic trading. Exemplary trading tools include, but should not be limited to, charts, trading ladders, order entry tools, automated trading tools, automated spreading tools, risk management tools, order parameter tools, order entry systems, market grids, fill windows, and market order windows, combinations thereof, other electronic tools used for trading, preparing to trade, or managing trades.

Trading screens may display market information and may be interactive. An interactive trading screen may allow, for example, one or more trading actions to be performed using the trading screen. For example, as will be discussed below, an interactive trading screen may allow one or more order entry parameters to be set, sent, or set and sent using one or more order entry actions. The display device 116 or input device 117, for example, may be used to interact with the trading screen.

The input device 117 may be, for example, a keyboard, mouse, microphone, touch-screen, trackball, keypad, joystick, or other device for inputting a signal. The input device 117 may be used, for example, to provide command selections to processor 112. For example, the input device 117 may be a mouse that is used to control a cursor displayed on a trading screen. The mouse may include one or more buttons for selection and control. Likewise, the output device 118 may be, for example, a keyboard, mouse, speakers, touch-screen, trackball, keypad, haptic device or system, joystick, or other device for outputting a signal. The output device 118 is used, for example, to output one or more signals, such as a haptic signal or an audio signal, to a user.

The gateway 120 is adapted to communicate with the trading device 110 and the exchange system 130 and may facilitate communication between the client device 110 and the server side device 140 and the exchange system 130. For example, the gateway 120 may receive trade orders from the client device 110 and transmit the trade orders to the exchange system 130. As another example, the gateway 120 may receive market data from the exchange 130 and transmit the market data to the trading device 110.

The gateway 120 performs processing on data communicated between the client device 110 and the exchange system 130. For example, the gateway 120 may process a trade order received from the trading device 110 into a data format acceptable by the exchange 130. Similarly, the gateway 120 may transform market data in an exchange-specific format received from the exchange 130 into a format understood by the trading device 110. The processing may include protocol translation or conversion. The processing of the gateway 120 may also include tracking orders from the trading device 110 and updating the status of the order based on fill confirmations received from the exchange system 130, for example. As another example, the gateway 120 may coalesce market data from one or more exchange systems and provide it to the trading device 110.

In general, the exchange system 130 may be owned, operated, controlled, or used by an exchange. Exemplary exchanges include the London International Financial Futures and Options Exchange ("LIFFE"), the Chicago Board of Trade ("CBOT"), and the Chicago Mercantile Exchange ("CME"). The exchange system 110 may be an electronic matching system, such as a computer, server, or other computing device, that is adapted to allow tradeable objects, for example, offered for trading by the exchange, to be bought and sold.

The exchange system 130 is adapted to match quantity of a trade order with quantity of another trade order that can result in an order fill or partial fill. A trade order may include one or more order entry parameters. For matching purposes, the exchange system 110 includes a matching engine adapted to match the trade orders. The exchange system 130 is adapted to match trade orders to buy and sell one or more tradeable objects. The tradeable objects may be listed for trading by the exchange system 130. A trade order may be received from the client device 110 or from the server side device 140. A trade order may also be received from the client device 110 through the gateway 120, for example. In addition, a trade order may be received from other devices in communication with the exchange system 130. Typically the exchange system 130 will be in communication with a variety of other client devices (which may be similar to client device 110) that also provide orders to be matched.

Furthermore, the exchange system 130 is adapted to provide market data. The market data may be provided to the client device 110, for example, through the gateway 120. Once received, the trading device 110 may process and display the market data. If displayed, the market data may be displayed on the display device 116, for example, as part of a trading screen.

As mentioned above, the trading system 100 may include a server side device 140. The server side device 140 may be a server, gateway, personal computer, remote processing device, a combination thereof, or other computing device. For example, the server side device 140 may be a server running an automated trading tool, such as Autospreader™ or Autotrader™ both of which are provided by Trading Technologies International, Inc. The automated trading tool may be controlled using the trading device 110, even though the server, along with the gateway 120, may be physically located at, in, around, or near the exchange system 130.

The server side device 140 may provide processing at a site that is physically located closer to the exchange system 130 than the trading device 110. Accordingly, all, some, or none of the acts or functions of the trading device 110, the gateway 120, or both the trading device 110 and gateway 120 may be performed by the server side device 140. For example, the exchange system 130 may be running a copy of X_TRADER™ that is controlled by the trading device 110.

The server side device 140 may be in communication with and coupled with the gateway 120 via communication network 106. The server side device 140 may receive one or more order entry parameters. The exchange system 130 may submit a trade order to the exchange system 130, for example, via the gateway 120. The trade order may include one or more the of the order entry parameters received from the trading device 110. The server side device 140 may also be adapted for working the trade order with the exchange system 130. Working a trade order may include submitting a trade order, re-quoting a trade order, cancelling a trade order, sending a hedge order, managing a trade order, or any combination thereof.

In some embodiments, the server side device 140 may be adapted to communicate directly with the exchange system 130 and may be able to communicate with the exchange system 130 without the gateway 120.

Before explaining further, it is noted that the trading system 100 is provided as an exemplary embodiment. The configuration and arrangement may change depending on the exact implementation. For example, the configuration and arrangement may change depending the requirements of the electronic exchange. Furthermore, other now known or later developed components may be incorporated into the trading system 100.

II. Order Entry Method

Figure 2:
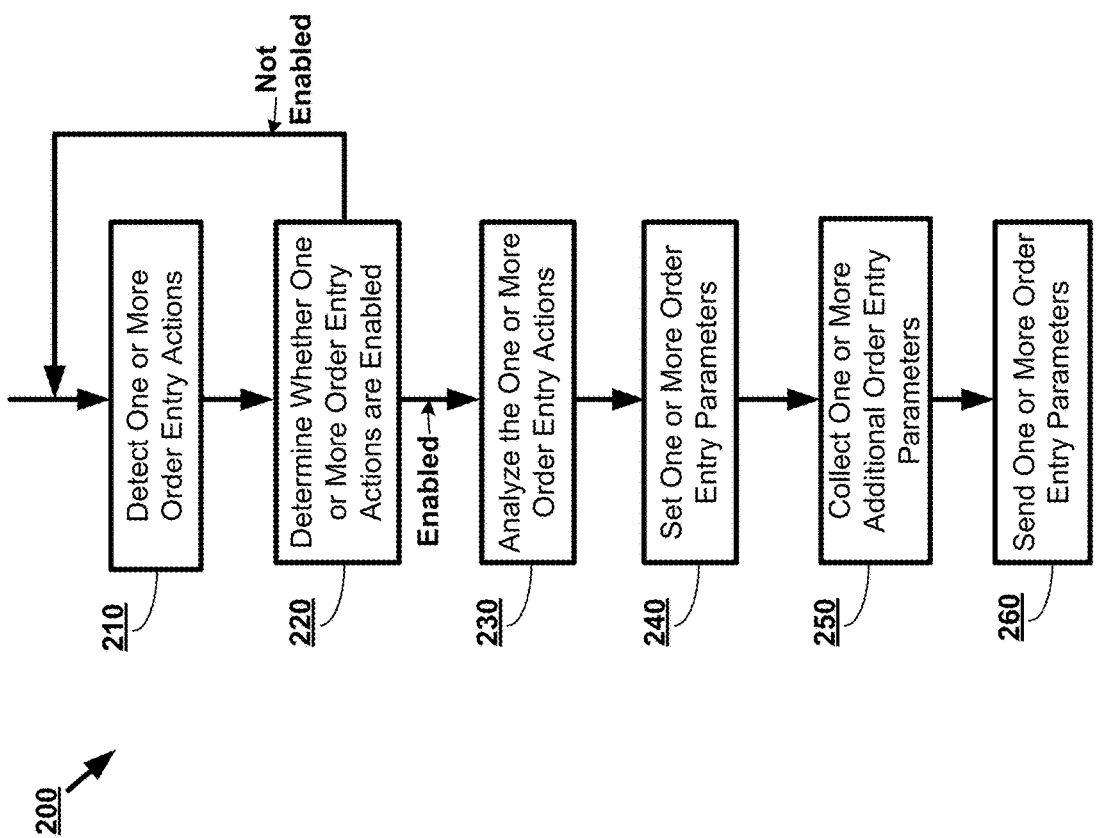
FIG. 2 illustrates an example order entry method that may be executed to perform order entry during an electronic trading process.

FIG. 2 illustrates an example of an order entry method 200. The order entry method 200 is implemented using the system 100 of FIG. 1 or a different system. For example, in certain embodiments, one, some, or all of the acts in the order entry method 200 are executed by the trading device 110 of FIG. 1.

The order entry method 200 may include detecting one or more order entry actions 210, determining whether the one or more order entry actions are enabled 220, analyzing the one or more order entry actions 230, setting one or more order entry parameters 240, collecting one or more additional order entry parameters 250, and sending one or more order entry parameters 260. However, the order entry method 200 may include additional, different, or fewer acts. For example, the order entry method 200 may not include act 250. In another example, acts 250 and 260 may not be included in the order entry method 200.

The acts may be performed in the order shown in FIG. 2 or a different order. For example, act 210 may be performed after or at the same time as act 220. In another example, act 250 may be performed at the same time as or before either act 230 or act 240.

In act 210, a trading device, such as the trading device 110 of FIG. 1, may detect one or more order entry actions. As discussed in more detail below, detecting one or more order entry actions may include detecting when a cursor is moved across an order entry line, a cursor is moved into an order entry region, an order entry button is activated (e.g., pressed down, released up, or both); an order entry gesture is performed, or any combination thereof.

In act 220, the trading device determines whether one or more order entry actions are enabled. In the event that the one or more order entry actions are enabled (e.g., "ENABLED" in FIG. 2), the order entry method proceeds to act 230. Otherwise, in the event that the one or more order entry actions are not enabled (e.g., "NOT ENABLED" in FIG. 2), the order entry method 200 may proceed back to act 210. Alternatively, the order entry method may proceed back to just prior to act 220.

When an order entry action is enabled, performing the order entry action may produce a result, such as setting one or more order entry parameters, sending one or more order entry parameters, or both setting and sending one or more order entry parameters. However, in the event that the order entry action is not enabled, performing the order entry action does not produce a result. For example, in certain embodiments, when the order entry action is not enabled, the order entry action may still be performed, however, the performance will not produce a result. By way of example, in the event that an order entry action, such as crossing an order entry line is not enabled, the cursor may still move across the order entry line; however, the result, such as setting an order entry parameter, may not be completed.

However, in some embodiments, if the order entry action is not enabled, the user may be prevented from even performing the order entry action. By way of example, as will be discussed in more detail below, an order entry region may have an order entry gate. The order entry gate may be closed, for example, preventing access to the order entry region, when the order entry action is not enabled. However, upon enabling the order entry action, the order entry gate may open and a cursor may be moved into an order entry region.

In act 230, the trading device analyzes the one or more order entry actions. Analyzing one or more order entry actions may include mapping one or more order entry actions to one or more order entry parameters. An order entry action may be associated with one or more order entry parameters and may be used to identify the one or more order entry parameters that should be set, sent, or both set and sent. For example, an order entry line may be associated with a specific price parameter and order type parameter. When a cursor crosses the order entry line, the trading device may be adapted to identify the specific price parameter and order type parameter.

In act 240, the trading device sets one or more order entry parameters. Setting one or more order entry parameters may include preparing for use, for example, by formatting or otherwise preparing to send the one or more order entry parameters. Setting an order entry parameter may include defining a value for the parameter. For example, a value, such as a price value (e.g., 94) may be defined for a price parameter. Other values may be defined for other parameters. Additionally, or alternatively, setting one or more order entry parameters may include loading the one or more order entry parameters into message or packet.

In act 250, the trading device obtains one or more additional order entry parameters. Obtaining one or more additional order entry parameters may include receiving, requesting, retrieving, or otherwise obtaining one or more additional order entry parameters. In certain embodiments, one or more additional order entry parameters are preset parameters. As used herein, a preset parameter may be default parameter or a parameter that is set prior to one or more order entry actions being performed. Preset parameters may be stored in memory. For example, an object definition parameter may be a preset parameter, for example, when a trading tool is selected for operation. A trading tool may be associated with a specific tradeable object. Accordingly, when the trading tool is selected, the object definition parameter may be set to define, for example, the specific tradeable object. The object definition parameter may be referred to as a preset parameter, for example, because it is associated with each order entry parameter that is set using a trading tool.

In act 260, the trading device sends one or more order entry parameters, for example, to a server side device, exchange system, memory, or other communication device. The one or more order entry parameters may include the one or more order entry parameters that were set in act 240, the one or more additional order entry parameters obtained in act 250, or a combination thereof.

In certain embodiments, the trading device sends the one or more order entry parameters to a server side device, such as the server side device 140 of FIG. 1, which is adapted to work a trade order with the exchange system, such as the exchange system 130 of FIG. 1. The server side device may receive the one or more order entry parameters from the trading device and generate a trade order using the one or more order entry parameters. When generating the trade order, the server side device may combine the one or more order entry parameters received from the trading device with one or more order entry parameters stored on the server side device. Once generated, the server side device may submit the trade order to the exchange system, for example, via one or more intermediary components, such as a gateway. Alternatively, the trade order may be submitted directly to the exchange system.

In certain embodiments, the trading device may send one or more order entry parameters to the exchange system, for example, via a gateway, such as the gateway 120. The one or more order entry parameters may be sent in the form of a trade order to the exchange system. The trading device may generate and submit a trade order including the one or more order entry parameters.

In certain embodiments, the trading device may send the one or more order entry parameters to a local or remote storage device. The one or more order entry parameters may be stored, for example, locally in the trading device or at a remote data store. For example, the one or more order parameters may be sent to main memory 113 or data storage 114 of FIG. 1 or to a remote data store via the network interface 115.

III. Order Entry Actions

As mentioned above, in various embodiments, the trading device 110 is adapted to set one or more order entry parameters, send one or more order entry parameters, or both set and send one or more order entry parameters. Setting, sending, or both setting and sending one or more order entry parameters is, for example, performed in response to or based on one or more order entry actions. An order entry action may be, for example, an action performed or initiated by a trader. Exemplary order entry actions include, but should not be limited to, moving a cursor across an order entry line, moving a cursor into an order entry region, pressing an order entry button, or performing a gesture. Other order entry actions may be performed when setting, sending, or setting and sending one or more order entry parameters.

Figure 3:
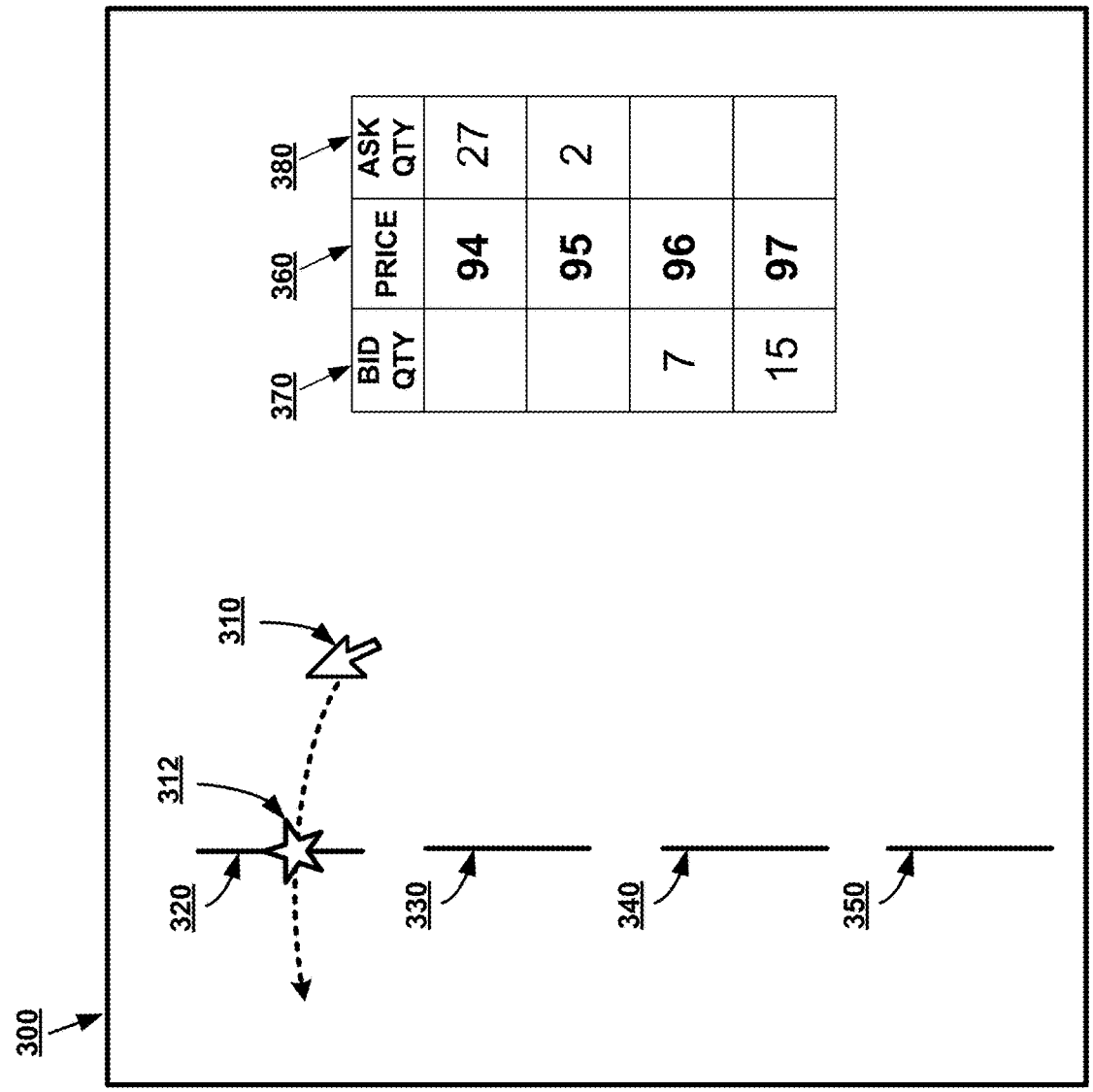
Figure 4:
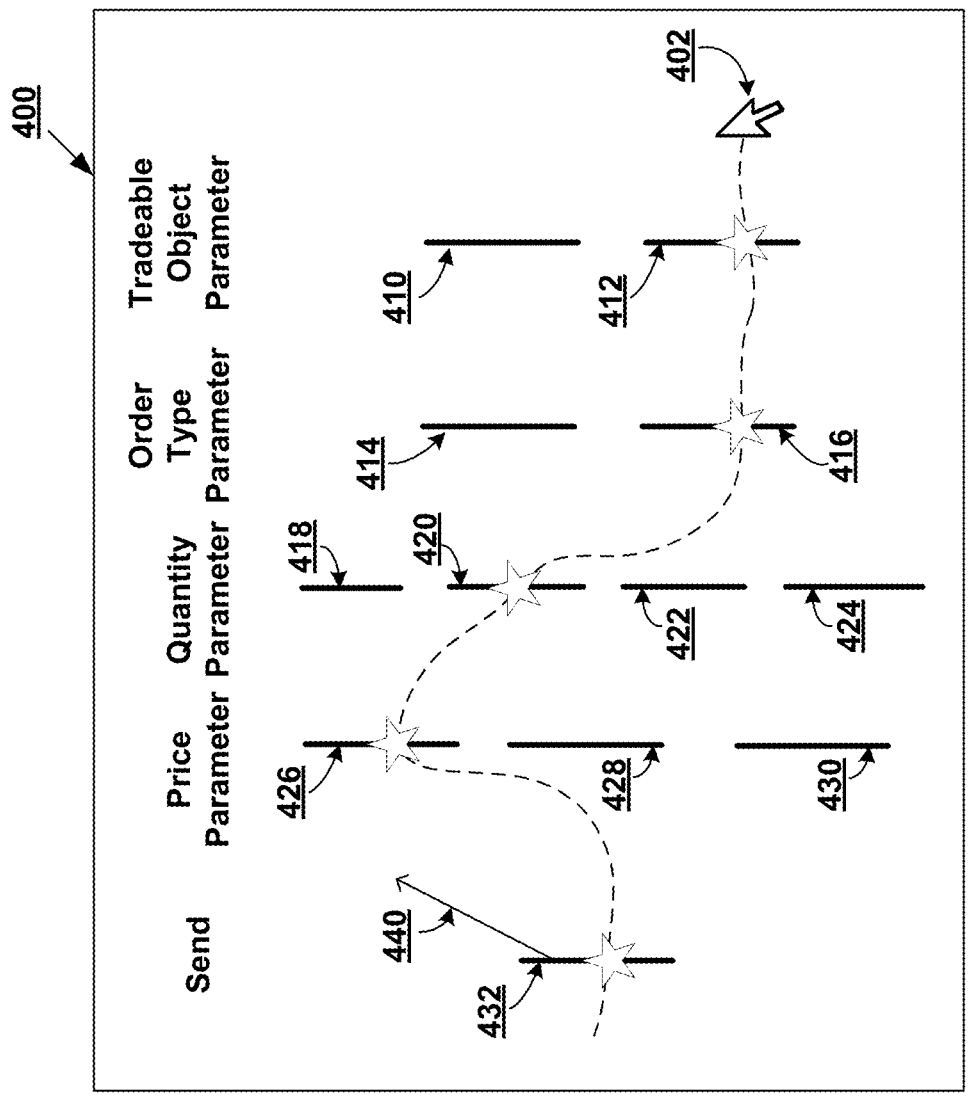
Figure 7:
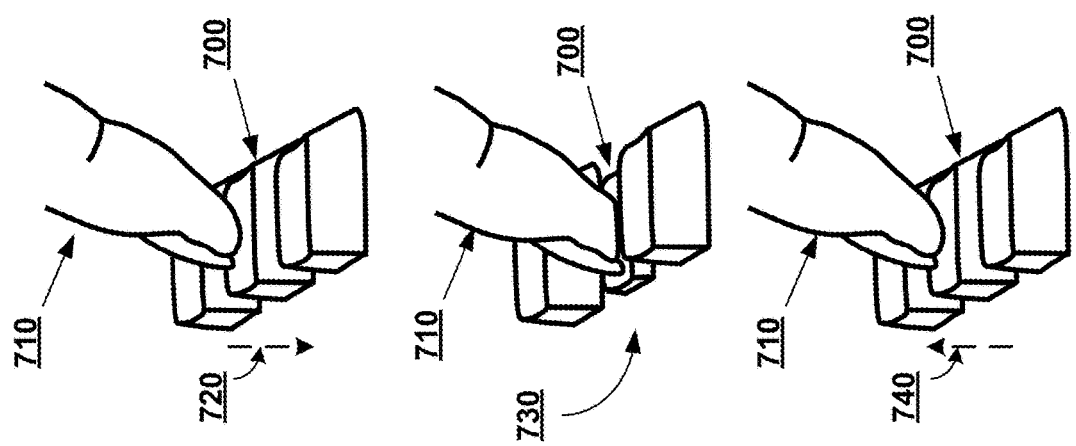
Figure 8:
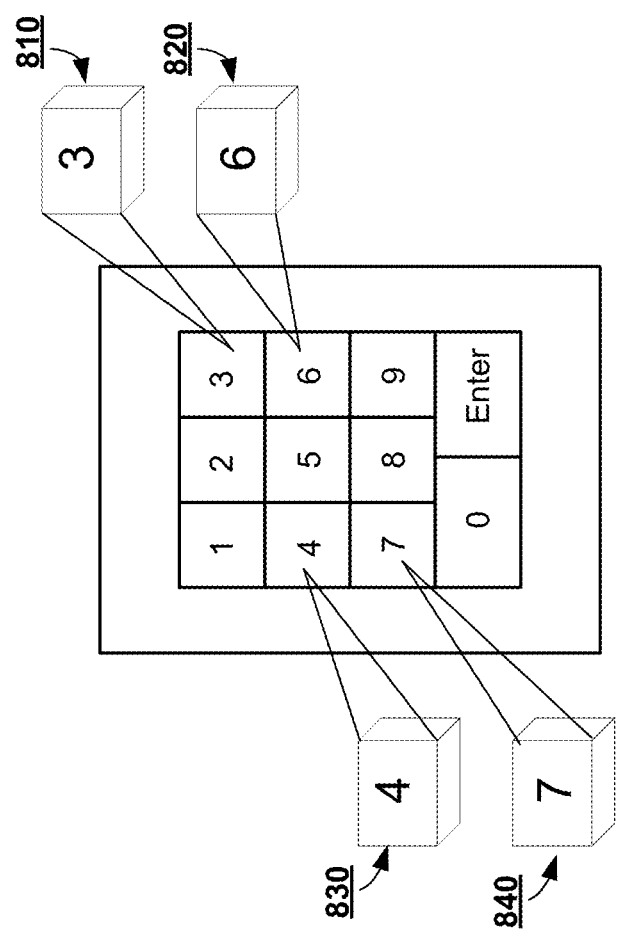

As will be described in more detail below, FIG. 3-FIG. 12 illustrate exemplary order entry actions. More specifically, FIG. 3 and FIG. 4 illustrate various embodiments where moving a cursor across an order entry line is an order entry action. FIG. 5 and FIG. 6 illustrate various embodiments where moving a cursor into an order entry region is an order entry action. FIG. 7 and FIG. 8 illustrate various embodiments where activating an order entry button is an order entry action. FIG. 9-12 illustrate various embodiments where performing a gesture is an order entry action.

A. Order Entry Line

FIG. 3 illustrates an example trading screen 300. The trading screen 300 includes a cursor 310 and an order entry line 320. In various embodiments, the trading screen 300 may include additional, different, or fewer components. For example, as shown in FIG. 3 and explained in more detail below, the trading screen 300 may include additional order entry lines, such as order entry line 330, order entry line 340, order entry line 350, or any combination thereof. In another example, as shown in FIG. 3, the trading screen 300 includes one or more trading tools, such as a price axis 360, bid quantity axis 370, ask quantity axis 380, or any combination thereof. The price axis 360, bid quantity axis 370, and ask quantity axis 380 may be referred to collectively as a market depth trading tool. A market depth trading tool may be used to place orders for a tradeable object and display market depth at certain price levels. Other trading tools, such as charts, parameter fields, last traded quantity axis, order entry axis, or other trading tools related to order entry, may be included in the trading screen 300.

The trading screen 300, as well as the components and tools included in the trading screen 300, may be displayed, for example, on the display device 116 of FIG. 1 or a different display device.

The cursor 310 is controlled by a user, for example, using an input device, such as the input device 117 of FIG. 1 or a different input device. The cursor 310 may be a pointer or other indicator used to show the position on a display device that will respond to input from a text input or pointing device. The cursor 310 is displayed as part of the trading screen 300 and controlled by the user to set, send, or both order entry parameters. Although a single cursor is shown, it is possible that there are multiple cursors, which may be used to perform the same or different order entry actions.

During operation, a user moves the cursor 310 (e.g., using an input device) across one or more of the order entry lines 320, 330, 340, 350. An order entry line may be used to set, send, or both set and send one or more order entry parameters, as described above. Accordingly, each order entry line may be associated with setting one or more order entry parameters, a command to send one or more order entry parameters, or both. For example, in the example of FIG. 3, order entry line 320 is associated with an ask at price value of "94" (e.g., shown in the price axis 360), order entry line 330 is associated with an ask at price value of "95," order entry line 340 is associated with a bid at a price value of "96," and order entry line 350 is associated with a bid at a price value of "97." This association can change if the inside market is re-centered or repositioned manually or automatically.

When the user moves the cursor 310 across or over the order entry line 320, as illustrated by the star 312, a price parameter may be set to a value of 94 and an order type parameter may be set to "buy." The order type parameter is set to "buy" because of the location of the selected price level relative to the inside market. For example, since the inside market is below the price level of "94," the order type parameter is set to "buy." Other relationships may be used for setting the order type parameter as well. However, in other embodiments, the order type parameter may be a default parameter. The price parameter and order type parameter may be combined with one or more additional order entry parameters or sent by themselves. For example, price parameter and order type parameter may be combined with (e.g., sent with) a preset quantity parameter. The quantity parameter may have been defined in a text field prior to, at the same time as, or after the price and order type parameters being set. There may optionally be a visual or auditory or other indication that the crossing of the order entry line has set a parameter. The value of the parameter may optionally be displayed visually on the interface or indicated via an auditory notification as a result of the crossing of the order entry line.

In the event that the price and order type parameters are set but not sent in response to the cursor crossing the order entry line 320, because that instance of the order entry line had been configured to set but not send, then the user may use the cursor 310 to initiate sending the order entry parameters. For example, a send button can be selected (e.g., pressed) to send all, some, or none of order entry parameters. The order entry parameters can be sent, for example, to a server side device or gateway connected to an exchange system. An order entry button can be selected to send at any time after setting.

Before explaining any further, it is worth noting again that the trading screen 300 or various components may be displayed as shown in FIG. 3 or with a different configuration. More specifically, one, some, or all of the order entry lines may be displayed vertically, horizontally, at any angle, or any combination thereof. Likewise, instead of being displayed in a column formation (e.g., stacked on top of each other), the order entry lines may be partially or fully disposed in a row (e.g., next to each other), at different corners of the trading screen, or along different columns, rows, or both columns and rows.

Furthermore, in various embodiments, an order entry line can be displayed on, overlaid onto, adjacent to, in combination with, or in replacement of a region, image, number, letter, display device, trading tool, or trading screen. For example, the order entry line 320 may be overlaid onto a boundary associated with the price value "94" in the price column 360 (e.g., the right-side boundary of the price column 360). The order entry line 330 may be overlaid onto a boundary associated with the price value "95" in the price column 360 (e.g., the right-side boundary of the price column 360). The order entry line 340 may be overlaid onto a boundary associated with the price value "96" in the price column 360 (e.g., the left-side boundary of the price column 360). The order entry line 350 may be overlaid onto a boundary associated with the price value "97" in the price column 360 (e.g., the left-side boundary of the price column 360).

In various embodiments, an order entry line may be straight or curved. For example, as shown in FIG. 3, the order entry lines are straight. However, in other examples, one or more of the order entry lines may include one or more curves. Furthermore, one or more of the order entry lines may be shaped into letters, numbers, pictures, or other shapes. For example, in various embodiments, the order entry line 320 may be shaped as a square and overlaid onto all of the boundaries of the price column 360 associated with the price value "94." In another example, the order entry line 320 is configured as number or a series of numbers, such as a "9," a "4," or "9" and "4" and placed in the price column 360 as a replacement of all or some of the text associated with the price value "94."

FIG. 4 illustrates using a plurality of order entry lines to set various order entry parameters and using an order entry line to send the various order entry parameters. FIG. 4 illustrates a trading screen 400. The trading screen 400 includes a cursor 402 and a plurality of order entry lines 410-432. The plurality of order entry lines 410-432 may be associated with a different order entry parameter. Each order entry line may be used to set a different order entry parameter.

Order entry lines 410, 412 may be used to set a trading object parameter. For example, order entry line 410 may be associated with tradeable object A and order entry line 412 may be associated with tradeable object B. Accordingly, since the cursor 402 crossed (e.g., illustrated by the star in FIG. 4) order entry line 412, the order entry parameter is set to tradeable object B. However, in the event that the cursor 402 crossed order entry line 410 instead of order entry line 412, the order entry parameter would be set to tradeable object A. Tradeable object A may be the same or different than tradeable object B.

In various embodiments, an order entry line may represent all or some of a trading strategy, such as a spread. For example, an order entry line may be associated with multiple (e.g., two or more) tradeable objects. An order entry line may correspond to multiple legs of a spread. However, in another example, a trader may each select a trading strategy by crossing multiple order entry lines that are associated with different tradeable objects.

Order entry lines 414, 416 may be used to set an order type parameter. Order entry line 414 may be associated with "buy" and order entry line 416 may be associated with "sell." In the example of FIG. 4, since the cursor 402 crossed (e.g., illustrated by the star in FIG. 4) order entry line 416, the order entry parameter is set to "sell." However, in the event that the cursor 402 crossed order entry line 414 instead of order entry line 416, the order entry parameter would have been set to "buy."

Order entry lines 418-424 may be used to set a quantity parameter. For example, order entry line 418 may be associated with a first quantity value, order entry line 420 may be associated with a second quantity value, order entry line 422 may be associated with a third quantity value, and order entry line 424 may be associated with a fourth quantity value. In the example of FIG. 4, since the cursor 402 crossed (e.g., illustrated by the star in FIG. 4) order entry line 420, the quantity parameter is set to the second quantity value. Likewise, in the event that the cursor 402 had crossed one of the other order entry lines 418, 422, or 424, the quantity parameter would have been set to the associated quantity value. The first, second, third, and fourth quantity values may be the same or different as each other.

Order entry lines 426-430 may be used to set a price parameter. For example, order entry line 426 may be associated with a first price value, order entry line 428 may be associated with a second price value, and order entry line 430 may be associated with a third price value. In the example of FIG. 4, since the cursor 402 crossed (e.g., illustrated by the star in FIG. 4) order entry line 426, the price parameter is set to the second quantity value. Likewise, in the event that the cursor 402 had crossed one of the other order entry lines 428 or 430, the price parameter would have been set to the associated price value. The first, second, and third price values may be the same or different as each other.

Order entry line 432 may be used to send the various order entry parameters. Order entry line 432 may be associated with a command to send the order entry parameters set using the order entry lines 410-430, any additional order entry parameters (e.g., which were associated with preset or default values), or any combination thereof. In the example of FIG. 4, since the cursor 402 crossed (e.g., illustrated by the star in FIG. 4) the order entry line 432, the associated order entry parameters may be sent, for example, to a server side device or exchange system via a gateway. Order entry lines may correspond to +1, −1 from inside market.

In various embodiments, one or more of the order entry lines may dynamically change positions on the trading screen. Movement may be based on, for example, position of the cursor 402, position of a crossed order entry line, or predicted position of the cursor 402. Movement of the order entry lines may minimize the distance that the cursor needs to move to cross an order entry line. For example, as shown in FIG. 4, the order entry line 432 may dynamically move in direction 440 such that the distance between the order entry line 432 and order entry line 426 (e.g., the last crossed order entry line) is minimized or reduced. As a result, the position of an order entry line may dynamically change based on the operation of the user.

B. Order Entry Region

FIG. 5A illustrates an example trading screen 500. The trading screen 500 may include one or more order entry regions, such as order entry regions 510-540. Each order entry region may be associated with one or more order entry parameters, a command to send one or more order entry parameters, or a combination thereof. For example, in the example of FIG. 5, the order entry region 510 may be associated with a price value of "97" and an order type of "buy." The order entry region 520 may be associated with a price value of "96" and an order type of "buy." The order entry region 530 may be associated with a price value of "95" and an order type of "sell." The order entry region 540 may be associated with a price value of "94" and an order type of "sell."

One, some, or all of the order entry regions 510-540 may include a border 504 and one or more order entry gates 506. The border 504 may prevent the cursor 502 from entering into or exiting the order entry region and an order entry gate 506 may permit entering and exiting the order entry region. The cursor 502 is unable to cross the border 504 but may be moved through the order entry gate 506. The order entry gate 506 may be an opening in the border 504. In various embodiments, the order entry gate 506 may provide resistance. For example, the order entry gate 506 may be closed at certain times and open at other times. The user may open the order entry gate 506, for example, by pressing a button, "tapping" the order entry gate 506 with the cursor 502, or other act for opening the order entry gate 506. When attempting to enter or exit the order entry region, the cursor 502 is maneuvered, for example, by the user using an input device, through the order entry gate 506. This may include opening the order entry gate 506. The border 504 and one or more order entry gates 506 may be configured in any shape, size, or position.

One or more order entry parameters may be set, sent, or both set and sent when the cursor is maneuvered into the order entry region. For example, as shown in FIG. 5A, when the cursor 502 is maneuvered or steered through the order entry gate 506 and into the order entry region 530, the price parameter may be set to a value of "95" and the order type parameter may be set to a value of "sell." In various embodiments, although not required, the price parameter and order type parameter may also be immediately or in delayed fashion sent in response to the cursor 502 entering the order entry region 530. Likewise, the price parameter and order type parameter may be set to other values depending on which order entry region the cursor 502 was moved into.

FIG. 5B illustrates an order entry region with multiple entry gates, such as order entry gates 572-578. Each one of the order entry gates may be associated with setting, sending, or both setting and sending one or more order entry parameters. In various embodiments, the order entry gates may be used to set, send, or both set and send one or more order entry parameters. For example, as shown in FIG. 5B, the first order entry gate 572 may be associated with tradeable object A. Order entry gate 574 may be associated with buying at a first price value. Order entry gate 576 may be associated with buying at a second price value. Order entry gate 578 may be associated with buying at a third price value. In the example of FIG. 5B, the tradeable object parameter may be set to tradeable object A since the cursor 502 was moved through order entry gate 572 (e.g., as illustrated by the star near order entry gate 572), and the order type parameter may be set to "buy" since the cursor 502 was moved through (e.g., as illustrated by the star near order entry gate 578) the order entry gate 578.

FIG. 5C illustrates a series (e.g., including two or more) of order entry regions 580. The series of order entry regions 580 may be used to set, send, or set and send one or more order entry parameters. For example, as shown in FIG. 5C, the order entry region 582 may be used to set a price parameter and the order entry region 584 may be used to send the price parameter. In another example, the order entry region 582 may be used to set a price parameter and the order entry region 584 may be used to set a quantity parameter. In yet another example, the order entry region 582 may be used to set a price parameter and the order entry region 584 may be used to select a default parameter, for example, in the event that there are multiple default parameters to choose among.

The series of order entry regions 580 may include additional order entry regions, for example, such that a combination of order entry parameters may be selected and set. The order entry regions may be displayed in any format. For example, the order entry regions may be displayed in a column, in a row, or at an angle relative to each other. Furthermore, the size and shape of one or more of the order entry gates may vary. For example, instead of placing an order entry gate along the side of the order entry region, an order entry gate may be disposed at a corner of the order entry region.

FIG. 6A and FIG. 6B illustrate various examples of moving a cursor into an order entry region without a border. More specifically, FIG. 6A illustrates moving a cursor into an order entry region without a border and FIG. 6B illustrates moving a cursor into a sub-region of the order entry region.

FIG. 6A illustrates an example trading screen 600. As mentioned above, a trading screen may include one or more order entry regions. For example, as shown in FIG. 6A, the trading screen 600 includes order entry regions 610, 620, 630, 640. The cursor 602 is moved into the order entry region 630, for example, under the control of the user using the input device.

An order entry region may not include a border that prevents the cursor from entering or exiting the order entry region. Without a border, the cursor 602 may enter or exit the order entry region from any direction. The order entry region may overlay one or more trading tools. For example, as shown in FIG. 6A, the order entry region may overlay or represent all or some of the bid quantity column, price column, and ask quantity column. In other embodiments, an order entry region may overlay or represent a single trading tool. For example, the order entry region may overlay only the price column.

In FIG. 6A, the order entry region 610 is associated with a price value of "97" and an order type of "buy." The order entry region 620 is associated with a price value of "96" and an order type of "buy." The order entry region 630 is associated with a price value of "95" and an order type of "sell." The order entry region 640 is associated with a price value of "94" and an order type of "sell."

In the event that the cursor 602 is moved into the order entry region 630, the price parameter may be set to a value of "95" and the order type parameter may be set to a value of "sell." Similarly, in the event that the cursor 602 is moved into one of the other order entry regions 610, 620, 640, the price parameter and order type parameter may be set in accordance with the associated values.

The various order entry parameters may be sent in response to the cursor 602 being moved into the order entry region 630. However, in other embodiments, a separate, independent order entry action may be performed to send the various order entry parameters.

An order entry region may include one or more sub-regions associated with the same or different order entry parameters. For example, as shown in FIG. 6B, the order entry region 630 may include sub-region 632, sub-region 634, and sub-region 636. The sub-regions 632-636 may be associated with the quantity parameter. For example, sub-region 632 may be associated with a quantity of "1," sub-region 634 may be associated with a quantity of "5," and sub-region 636 may be associated with a quantity of "10." Accordingly, in addition to setting the price parameter and order type parameter when the cursor 602 is moved into the order entry region 630, the quantity parameter may be set depending on which sub-region the cursor 602 is moved into. For example, as shown in FIG. 6B, since the cursor 602 is moved into sub-region 636, the quantity parameter may be set to a value of "10." Similarly, in the event that the cursor 602 was moved into sub-region 632 or 634, the quantity parameter would have been set to the corresponding value.

C. Order Entry Button

FIG. 7 and FIG. 8 illustrate various embodiments of using an order entry button to perform an order entry action. More specifically, FIG. 7 illustrates various order entry actions and FIG. 8 illustrates an example of using order entry buttons during operation.

FIG. 7 shows an exemplary order entry button 700 that may be activated, for example, by a user's finger 710. The order entry button 700 may be located on a keyboard, mouse, touch-screen, or other input device. The order entry button 700 may be associated with one or more order entry actions.

In various embodiments, an order entry action may include pressing (e.g., represented by the arrow 720) the order entry button 700. An order entry action may be performed when the user's finger 710 moves the order entry button 700 from the "up" state to a "down" state. For example, an order entry parameter, such as a price parameter, may be set when the order entry button 700 is pressed. In another example, an order entry action may be enabled by pressing the order entry button 700.

In various embodiments, an order entry action may include holding (e.g., represented by the holding position 730 shown in FIG. 7) the order entry button 700 in a "down" state, for example, for at least any preconfigured length of time or substantially no real length of time (e.g., just pressing it). The length of time may vary depending on the system or depending on user preferences. In an embodiment, the length of time that the order entry button 700 is held in a "down" state may be used to determine an order entry parameter. For example, holding the order entry button 700 down for a quarter of a second may set the quantity parameter to a value of "1;" holding the order entry button 700 down for half of a second may set the quantity parameter to a value of "5"; or holding the order entry button 700 down for one second may set the quantity parameter to a value of "10." The lengths of time in this example are for illustration. Any length of time may be used. A display window may be displayed on a trading screen to show how long the order entry button 700 has been held down or the value that will be set. In yet another embodiment, holding the order entry button 700 in a "down" state may enable another order entry action. For example, some order entry actions may be enabled only if the order entry button 700 is being held down.

In various embodiments, an order entry action may include releasing (e.g., represented by the arrow 740) the order entry button. An order entry action may be performed when the user's finger 710 allows the order entry button 700 to move (e.g., spring) into the "up" state from a "down" state. For example, an order entry parameter, such as a price parameter, may be set when the order entry button 700 is released. In another example, an order entry action may be enabled by releasing the order entry button 700. In an embodiment in which an order entry action is associated with releasing an order entry button, there may be a separate user action (e.g., pressing the Esc key on the keyboard) which allows the user to release the order entry button without taking the associated order entry action.

One, some, or all of the various embodiments shown in FIG. 7 may be combined with each other. For example, FIG. 8 illustrates an example of combining various embodiments shown in FIG. 7. In FIG. 8, the order entry button 810, which may be the 3-key on a numeric keypad, is associated with a price value of "94" and an order type of "buy." The order entry button 820, which may be the 6-key on a numeric keypad, is associated with a price value of "95" and an order type of "buy." The order entry button 830, which may be the 4-key on a numeric keypad, is associated with a price value of "96" and an order type of "sell." The order entry button 840, which may be the 7-key on a numeric keypad, is associated with a price value of "97" and an order type of "sell." The associations or various keys selected is not limited to those shown in FIG. 8. Any association or key may be used. FIG. 8 merely illustrates various concepts of some of the embodiments.

In the event that the order entry button 810 is pressed, the price parameter is set to a price value of "94" and the order type parameter is set to "buy." The order entry button 810 may be held down to set the quantity parameter. For example, holding the order entry button 810 down for one second may set the quantity parameter to "5." Finally, one, some, or all of the price, order type, and quantity parameters may be sent when the order entry button is released.

D. Gesture

In various embodiments, a trading device may include a motion detection device, such as a camera, infrared sensor, motion-detection headset, or vision-detection headset, as an input device. The motion detection device may be adapted to detect a gesture. As used herein, a gesture may be a movement, action, or position of one or more hands, arms, bodies, heads, faces, eyes, mouths, lips, or gesture devices that is expressive of a thought, desire, idea, opinion, or emotion. Accordingly, one or more gestures may be order entry actions.

Figure 9:
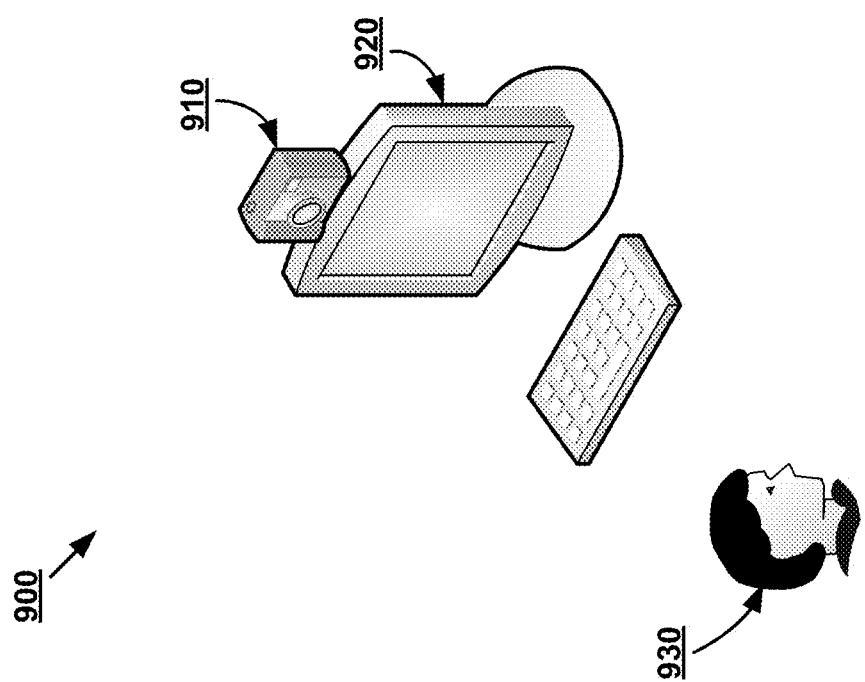
Figure 10:
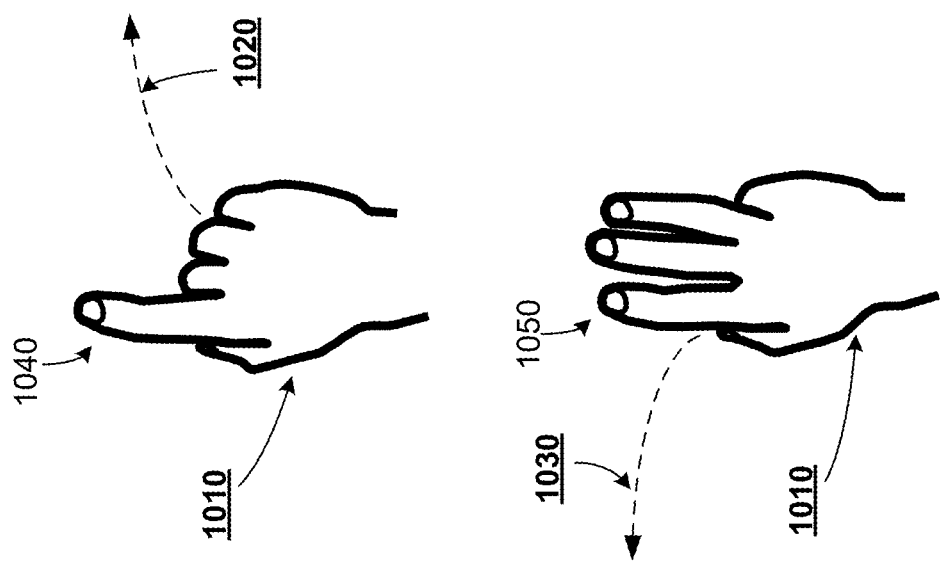
Figure 11:
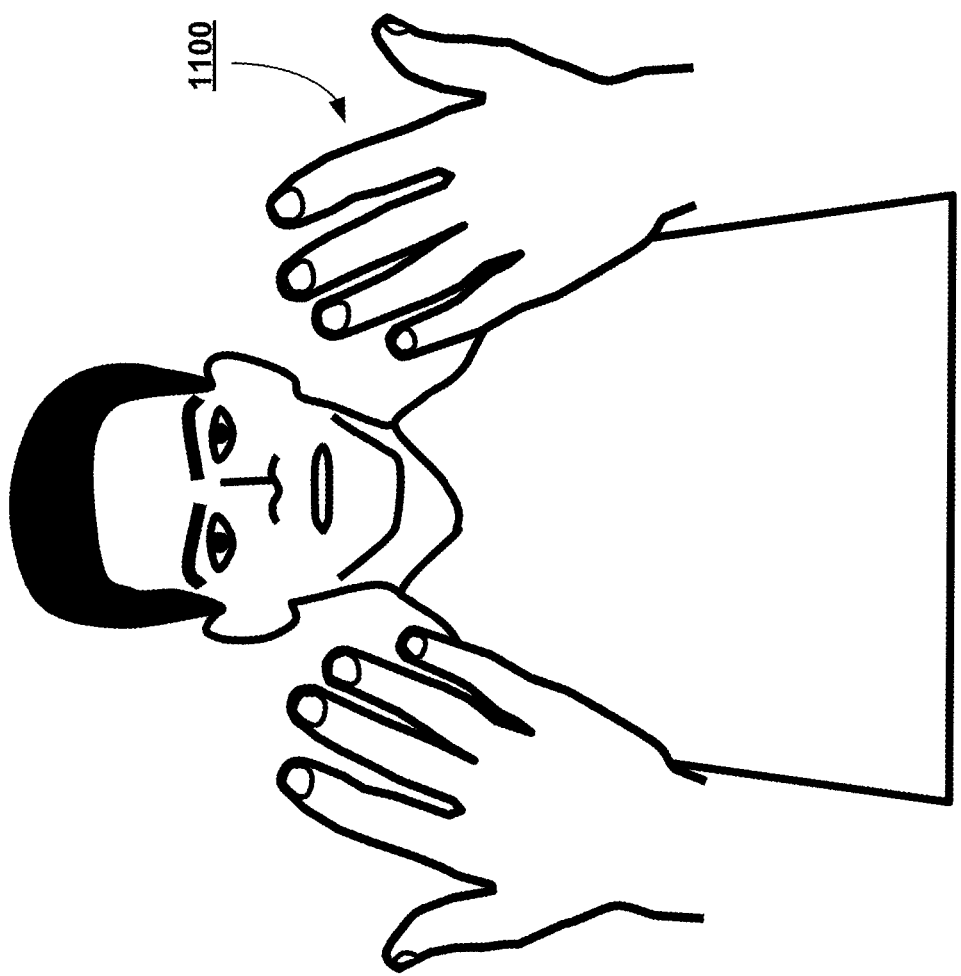

FIG. 9 illustrates a trading device with a motion detection device. FIG. 10-FIG. 12 illustrate exemplary gestures.

FIG. 9 illustrates an exemplary trading device 900. The trading device 900 may be the same or similar to the trading device 110 of FIG. 1. As shown in FIG. 9, the trading device 900 may include a motion detection device 910 and a display device 920. Additional, different, or fewer components may be provided. For example, the trading device 900 may include multiple motion detection devices, multiple display devices, or a combination thereof. In another example, as will be explained below, the trading device 900 may include a gesture device.

The motion detection device may be a camera, infrared sensor, motion-detection headset, or vision-detection headset, any combination thereof, or any other device adapted to detect one or more gestures of a user 930. The trading device 900 may be adapted to use the gesture as an order entry action. The gesture may be used to enable another order entry action, set one or more order entry parameters, send one or more order entry parameters, or any combination thereof.

In various embodiments, the motion detection device 910 is adapted to detect movements and signs made by the user 930. For example, as shown in FIG. 10, an order type parameter may be set to "buy" when a user waves the user's right hand 1010 to the right (e.g., illustrated by the arrow 1020) and set to "sell" when a user waves the user's right hand 1010 to the left (e.g., illustrated by the arrow 1030). Furthermore, the user's fingers may be used to set additional order entry parameters or send the various order entry parameters. For example, a quantity parameter may be set to a value of one (1) when the user extends one (1) finger 1040. However, the quantity parameter may be set to a value of three (3) when the user extends three (3) fingers 1050. The ration between fingers and the value may be a one-to-one ratio or merely an associated ratio. For example, extending two (2) fingers may set a quantity parameter to a value of five (5).

In other examples, as shown in FIG. 11 and FIG. 12, one or more conventional open outcry pit trading movements may be performed as order entry actions. A trading device, for example, with a motion detection device, may allow a trader to trade using these conventional signals. For example, as shown in FIG. 11, palms 1100 that are directed in towards the body indicate the action of buying and, as shown in FIG. 12, palms 1200 that are out indicate selling. Price is indicated at arm's length away from the body and quantity is displayed close to the face. Numerical quantities of 1-5 are displayed with vertical fingers and 6-9 are displayed with horizontal fingers. Quantities of 1-9 are indicated at chin level whilst increments of 10s are indicated at the forehead.

In various embodiments, a gesture device or controller may be used for tracking or identifying gestures. The gesture device may be a wand, bracelet, ring, controller, or other device that works in conjunction with the motion detection device. For example, in various embodiments, the motion detection device is an infrared sensor and the gesture device is an infrared controller, for example, including switches that detect when the controller is rotated, lifted and tilted. The infrared sensor may detect movements of the gesture device and determine motion. Triangulation may be used to determine motion.

During operation, the infrared controller may send out pulses of infrared light. The pulses may be sent on a certain frequency, which may be defined when the controller and sensor are synced. When the infrared controller sends out the pulse, the infrared sensor, for example, sitting on top a display device, receives the pulses at several different points and times. Using the time and distance from the controller to the sensor, the trading device can calculate gestures the trader is performing using trigonometry. Tilting, which relates to how high or low the gesture device is pointing, could be calculated using mercury switches or other forms of tilt sensors.

Referring back to FIG. 9, the motion detection device 910 may be adapted to detect which screen that the user 920 is looking at or even which region on a single screen the user 920 is looking at. For example, the motion detection device 910 may detect whether the user 930 is looking at a first computer monitor, a second computer monitor, or a third computer monitor. The first computer monitor may be displaying a market depth tool for tradeable object A. The second computer monitor may be displaying a market depth tool for tradeable object B. The third computer monitor may be displaying a market depth tool for tradeable object A.

IV. Enablement

An order entry action may set, send, or set and send one or more order entry parameters, for example, if the order entry action is enabled. An order entry action is enabled, for example, when the order entry action is operational or activated. An order entry action may be enabled by default. However, in other embodiments, an order entry action may be enabled by the same or a different order entry action. For example, in some embodiments, an order entry action, such as moving a cursor across an order entry line, is enabled only when an order entry button is selected (e.g., being held in a down state). However, in another example, an order entry action, such as a gesture, is enabled only when the order entry action is performed within a detection region. A detection region may be a region where a motion detection device is able to detect motion. The spatial region for enablement could be, for example, the volume in front of a trading screen and within a certain preconfigured distance of the screen.

V. Conclusion

While the inventions have been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from the spirit or scope of the present inventions. Therefore, it is intended that the inventions not be limited to the particular embodiments disclosed herein.

The invention claimed is:

1. A method including:
 displaying by a trading device on a graphical user interface a first order entry line, wherein the first order entry line is associated with a first value, wherein the first order entry line overlays a first region of a trading screen;
 displaying by the trading device on the graphical user interface a second order entry line, wherein the second order entry line is associated with a second value, wherein the second order entry line overlays a second region of the trading screen;
 detecting by the trading device a user input via a user input device to move a cursor displayed on the graphical user interface across the first order entry line and the second order entry line without operation of an order entry button of the user input device;

setting by the trading device, in response to detecting the user input, a first order entry parameter to the first value associated with the first order entry line;

setting by the trading device, in response to detecting the user input, a second order entry parameter to the second value associated with the second order entry line; and sending by the trading device, the set first and second order entry parameters to an exchange system.

2. The method of claim 1, wherein the first region is a boundary of a column of the trading screen, wherein the first value is associated with the column of the trading screen.

3. The method of claim 2, wherein the column is one of a bid column and an ask column.

4. The method of claim 3, wherein the first value represents a buy when the column is the bid column, wherein the first value represents a sell when the column is the ask column.

5. The method of claim 1, wherein the second region is a boundary of a region in a column of the trading screen, wherein the second value is associated with the region in the column of the trading screen.

6. The method of claim 5, wherein the region in the column corresponds to a price level.

7. The method of claim 6, wherein the second value is based on the price level corresponding to the region in the column.

8. The method of claim 1, wherein the first region of the trading screen overlays the second region of the trading screen.

9. The method of claim 1, wherein the user input is a gestural input.

10. The method of claim 1, further including:
receiving by the trading device a command to enable detection of the user input.

11. The method of claim 1, further including:
monitoring by the trading device the cursor, wherein detecting the user input is based on the monitoring of the cursor.

12. The method of claim 1, further including:
sending by the trading device, in response to receiving the user input, an order to an exchange system, wherein the order is based on the first order entry parameter and the second order entry parameter.

* * * * *